(12) United States Patent
Chang et al.

(10) Patent No.: US 6,246,518 B1
(45) Date of Patent: Jun. 12, 2001

(54) REFLECTION TYPE OPTICAL ISOLATOR

(75) Inventors: Kok Wai Chang, Sunnyvale; Kejian Guan, San Jose, both of CA (US)

(73) Assignee: E-Tek Dynamics, Inc., San Jose, CA (US)

( * ) Notice: Subject to any disclaimer, the term of this patent is extended or adjusted under 35 U.S.C. 154(b) by 0 days.

(21) Appl. No.: 09/276,476

(22) Filed: Mar. 25, 1999

(51) Int. Cl.$^7$ .................................................. G02B 5/30
(52) U.S. Cl. ..................... 359/494; 359/483; 359/484; 359/495; 359/497; 372/703
(58) Field of Search .................................. 359/483, 484, 359/494, 495, 497; 372/703

(56) References Cited

U.S. PATENT DOCUMENTS

| | | | |
|---|---|---|---|
| 4,178,073 | 12/1979 | Uchida et al. | 350/151 |
| 4,653,852 | 3/1987 | Suzuki et al. | 350/96.33 |
| 4,974,944 | 12/1990 | Chang | 350/377 |
| 5,033,830 | * 7/1991 | Jameson | 385/484 |
| 5,268,979 | 12/1993 | Weidman | 385/42 |
| 5,355,426 | 10/1994 | Daniel et al. | 385/39 |
| 5,381,503 | 1/1995 | Kanamori et al. | 385/231 |
| 5,446,578 | 8/1995 | Chang et al. | 359/282 |
| 5,471,340 | 11/1995 | Cheng et al. | 359/281 |
| 5,574,596 | 11/1996 | Cheng | 359/484 |
| 5,594,821 | 1/1997 | Cheng | 385/24 |
| 5,644,666 | 7/1997 | Campbell et al. | 385/43 |
| 5,734,763 | 3/1998 | Chang | 385/11 |
| 5,768,005 | 6/1998 | Cheng et al. | 359/281 |
| 5,825,950 | 10/1998 | Cheng | 385/27 |

* cited by examiner

*Primary Examiner*—Cassandra Spyrou
*Assistant Examiner*—Craig Curtis
(74) *Attorney, Agent, or Firm*—Randy W. Lacasse; Kevin E. Greene; Lacasse & Associates

(57) ABSTRACT

The isolator core having a walk-off crystal, a non-reciprocal rotator coupled to the walk-off crystal, and a reciprocal rotator coupled to the walk-off crystal.

23 Claims, 14 Drawing Sheets

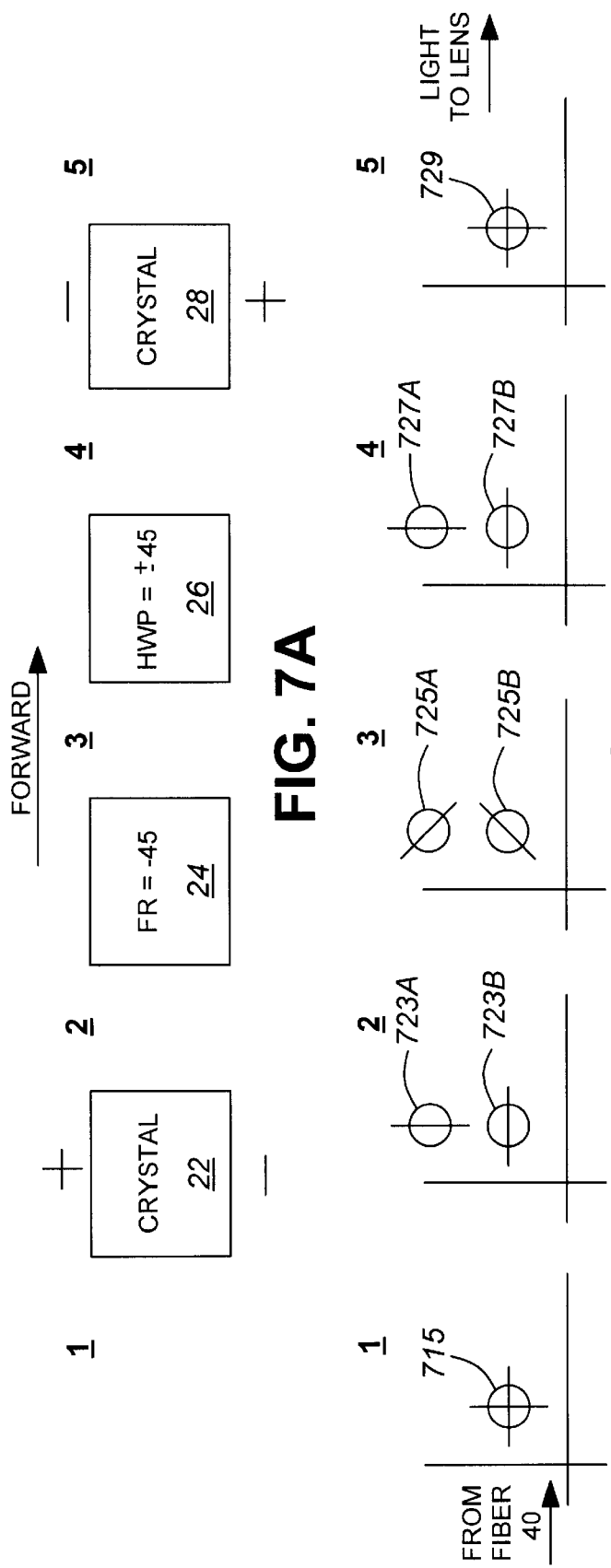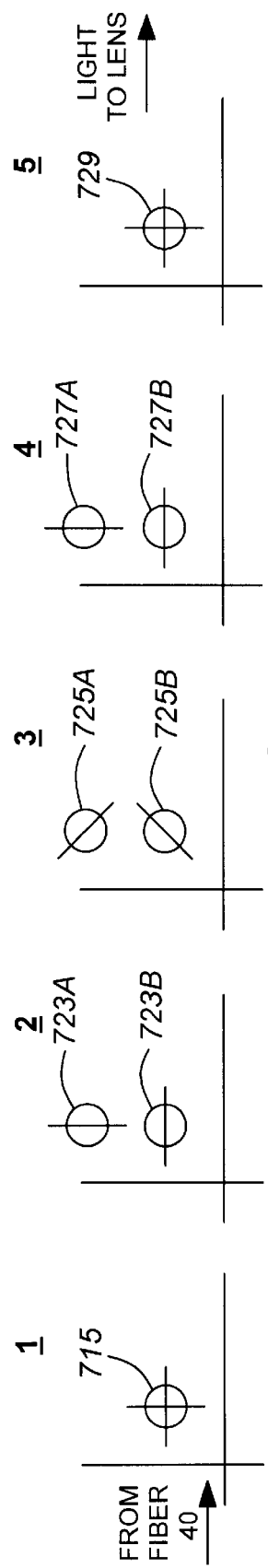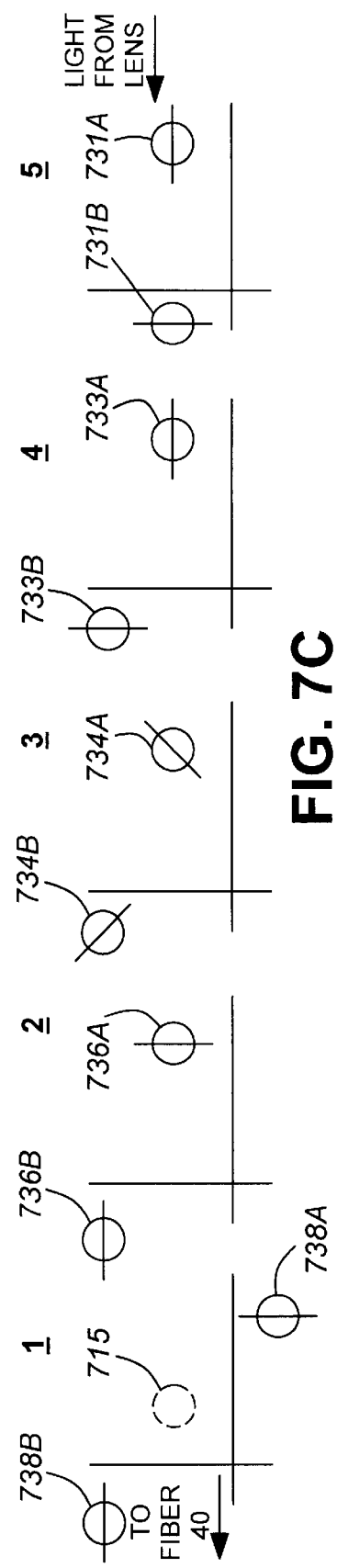

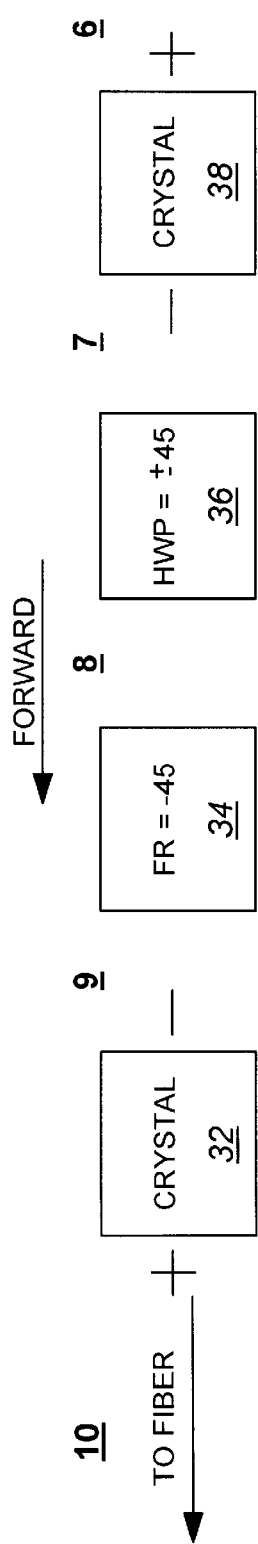
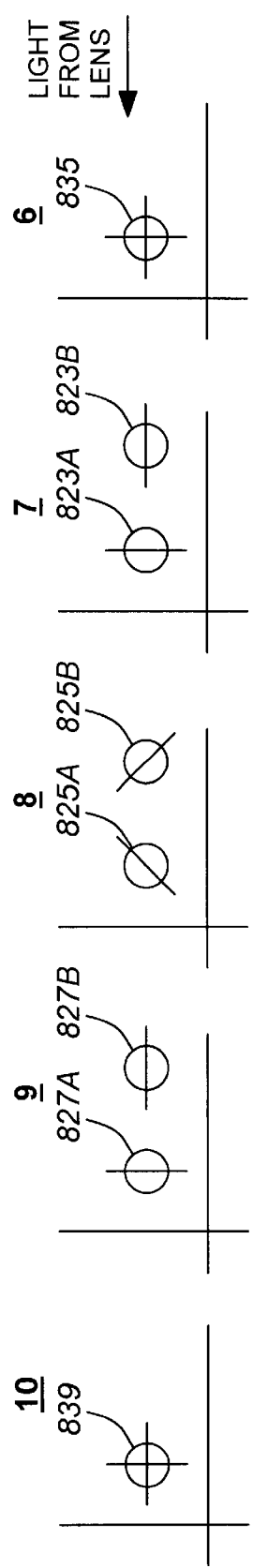
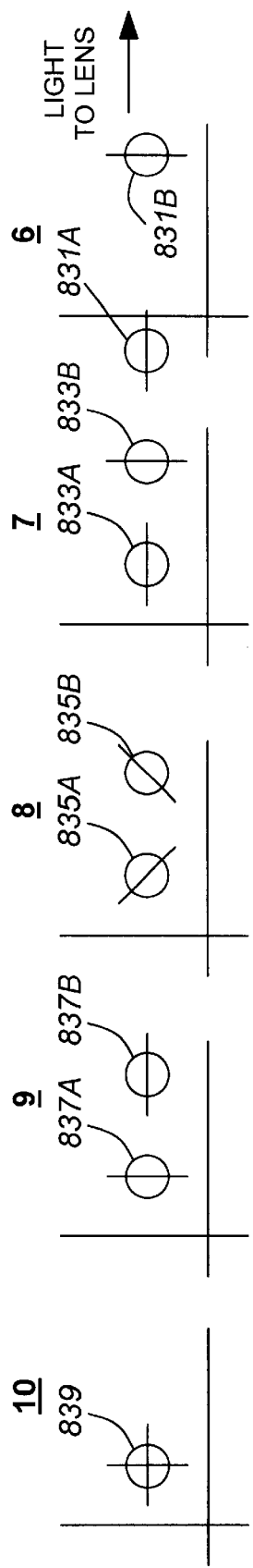
FIG. 8A
FIG. 8B
FIG. 8C

REFLECTION TYPE OPTICAL ISOLATOR

FIELD OF THE INVENTION

This invention relates to the field of fiber optics and, more specifically, to optical isolators.

BACKGROUND

Optical isolators are used in fiber optic systems to propagate signals in a direction while preventing propagation of signals along a reverse of the direction. These optical isolators are often used to prevent unwanted signal reflections from being transmitted back to a signal's source. Typical optical isolators have components to separate, rotated, and recombine orthogonally polarized light. These components function to propagate light beams from the input to the output of the isolator while diverting light beams traveling in the opposite direction to prevent them from reaching the input port.

One type of optical isolator uses an isolator core positioned in-line between two lens to couple light from an input fiber to an output fiber. The isolator core has, in sequence, an input walk-off crystal, a Faraday rotator, a half-wave plate, and an output walk-off crystal. In the forward direction, the input walk-off crystal divides an incident light beam from the input fiber into two polarized rays that are rotated by the Faraday rotator and the half-wave plate and then recombined by the output walk-off crystal. The Faraday rotator is a non-reciprocal device that rotates the polarization of light rays in the same direction regardless of which direction rays are passed through the device.

In the reverse direction, the output walk-off crystal also divides a light beam into two polarized rays. However, the non-reciprocal function of the Faraday rotator prevents the polarization of light traveling in the reverse direction from being rotated back to a position that will allow the two rays to be recombined by the input walk-off crystal. In this manner, light is prevented from reaching the input fiber in the reverse direction through the isolator core.

One problem with such an optical isolator is that number and size of individual components adds to the overall length and size of the optical isolator, thereby decreasing its desirability.

SUMMARY OF THE INVENTION

The present invention pertains to an isolator core. The isolator core including a walk-off crystal, a non-reciprocal rotator coupled to the walk-off crystal, and a reciprocal rotator coupled to the walk-off crystal.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7A illustrates cross-sections of the first stage components of another embodiment of an optical isolator.

FIG. 7B illustrates the polarization of a light beam as it propagates through another embodiment of the first stage of an isolator in a forward direction.

FIG. 7C illustrates the polarization states of light beams as it propagates through another embodiment of the first stage of an isolator in a reverse direction.

FIG. 8A illustrates cross-sections of the second stage components of another embodiment of an optical isolator.

FIG. 8B illustrates the polarization of a light beam as it propagates through another embodiment of the second stage of an isolator in a forward direction.

FIG. 8C illustrates the polarization states of a light beam as it propagates through another embodiment of the second stage of an isolator in a reverse direction.

DETAILED DESCRIPTION

In the following description, numerous specific details are set forth such as examples of specific materials, components, parameters, dimensions, etc. in order to provide a thorough understanding of the present invention. It will be apparent, however, to one skilled in the art that these specific details need not be employed to practice the present invention. In other instances, well known materials or components have not been described in detail in order to avoid unnecessarily obscuring the present invention. It should be noted that the designations clockwise and counterclockwise refer to the polarization rotations of light beams relative to their illustration in the Figures.

Figure 1A:
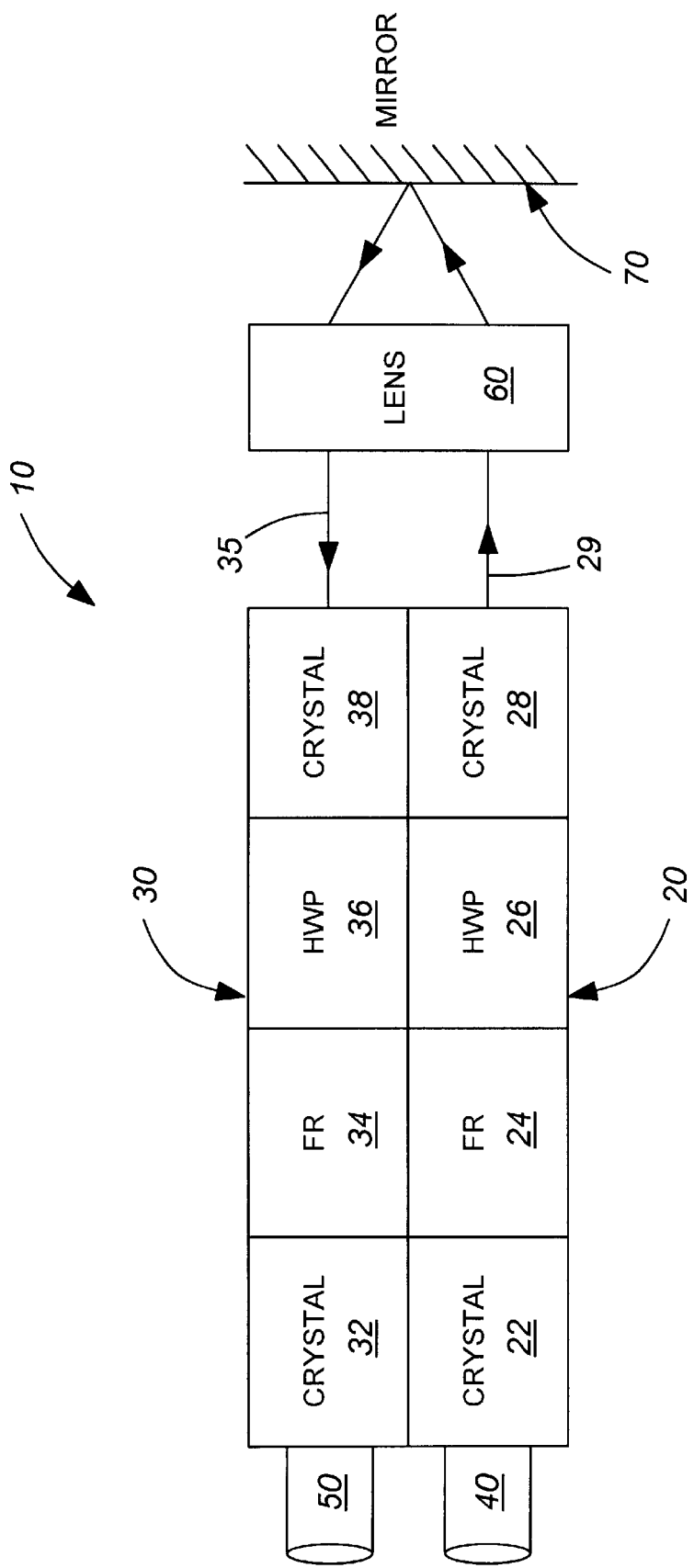
FIG. 1A illustrates one embodiment of a dual stage optical isolator.

FIG. 1A illustrates one embodiment of a dual stage optical isolator. Optical isolator 10 is a dual stage isolator that includes two isolator cores 20 and 30 placed in front of fibers 40 and 50, respectively. Lens 60 and a mirror 70 are positioned on the side of isolator cores 20 and 30 opposite that of fibers 40 and 50. Optical isolator 10 operates to transmit light from fiber 40 to fiber 50, while reducing the transmission of light from fiber 50 to fiber 40.

In one embodiment, isolator core 20 includes a walk-off crystal 22, a Faraday rotator (FR) 24, a half-wave plate (HWP) 26, and another walk-off crystal 28. Walk-off crystals 22 and 28 are crystals of birefringent material that split an unpolarized light beam into two orthogonally polarized light beams. When an anisotropic (birefringent) crystal is cut at a certain angle relative to its optical axis, the crystal will cause a component of light in a particular polarization direction to be diverted into a different path as it passes through the crystal. The amount of divergence is proportional to the thickness of the crystal. The direction that the polarization component is diverted is referred to as the walk-off direction of the crystal. A birefringent crystal, however, will only divert the polarization component in a polarization plane parallel to the walk-off direction and will not effect the polarization component in a plane perpendicular to the walk-off direction. In addition, a walk-off crystal is a reciprocal device such that the divergence of light passed through the crystal in a forward direction is opposite that of light passed through the crystal in a backward direction. Furthermore, two orthogonally polarized light beams are recombined into a single light beam when passed through a walk-off crystal.

In one embodiment, walk-off crystals 22 and 28 are constructed from a birefringent crystal having a high index of refraction, for example, rutile ($TiO_2$). The birefringent crystal divides an entering unpolarized light beam into two components referred to as an ordinary ray and an extraordinary ray. Rutile has an index of refraction for the ordinary ray ($n_o$) of 2.451 and an index of refraction for the extraordinary ray ($n_e$) of 2.709 at 1550 nanometer (nm) wavelength light.

In another embodiment, walk-off crystals 22 and 28 are constructed from other birefringent materials, for examples, calcite ($CaCO_3$) and yttrium vanadate ($YVO_4$). Yttrium vanadate, for example, has an index of refraction for the ordinary ray ($n_o$) of 2.1486 and an index of refraction for the extraordinary ray ($n_e$) of 1.9447 at 1550 nm wavelength light. By using a crystal with a high index of refraction, the angular divergence of light exiting the optical isolator may be reduced. In one embodiment, walk-off crystals 22 and 28 are constructed from the same material and have the same thickness. In another embodiment, walk-off crystals 22 and 28 may be constructed of different materials and different thickness but provide the same divergence of light.

Faraday rotator 24 operates to rotate the plane of polarization of light passed through it. A Faraday rotator is a non-reciprocal device that rotates the plane of polarization of light in the same direction when light is passed through it in either direction. It should be noted that even though Faraday rotators are set to perform a certain rotation at a certain temperature and wavelength of light, slight variations in both temperature and wavelength may introduce an error angle resulting in minor components of light beams at other polarization angles, referred to as leakage. Although, these minor components may not be completely isolated, they have not been shown for ease of illustration purposes. Only the major components of the polarized light beams are discussed and illustrated in the embodiments herein.

Half-wave plate 26 also operates to rotate the plane of polarization of light passed through it. A half-wave plate is a reciprocal device that rotates the plane of polarization of light based on the direction which light is passed through it.

Isolator core 30 includes a Faraday rotator 34 and a half-wave plate 36 similar to those describe above with respect to isolator core 20. Isolator core 30 also includes walk-off crystals 32 and 38 similar to the walk off crystals of isolator core 20 except that walk-off crystals 32 and 38 have walk-off directions that are rotated 90 degrees relative to the walk-off directions of walk-off crystals 22 and 28. It should be noted that a walk-off crystal, a Faraday rotator, and a half-wave plate are well known in the art; accordingly, a more detailed description of their internal composition and their operation is not provided herein.

Figure 1B:
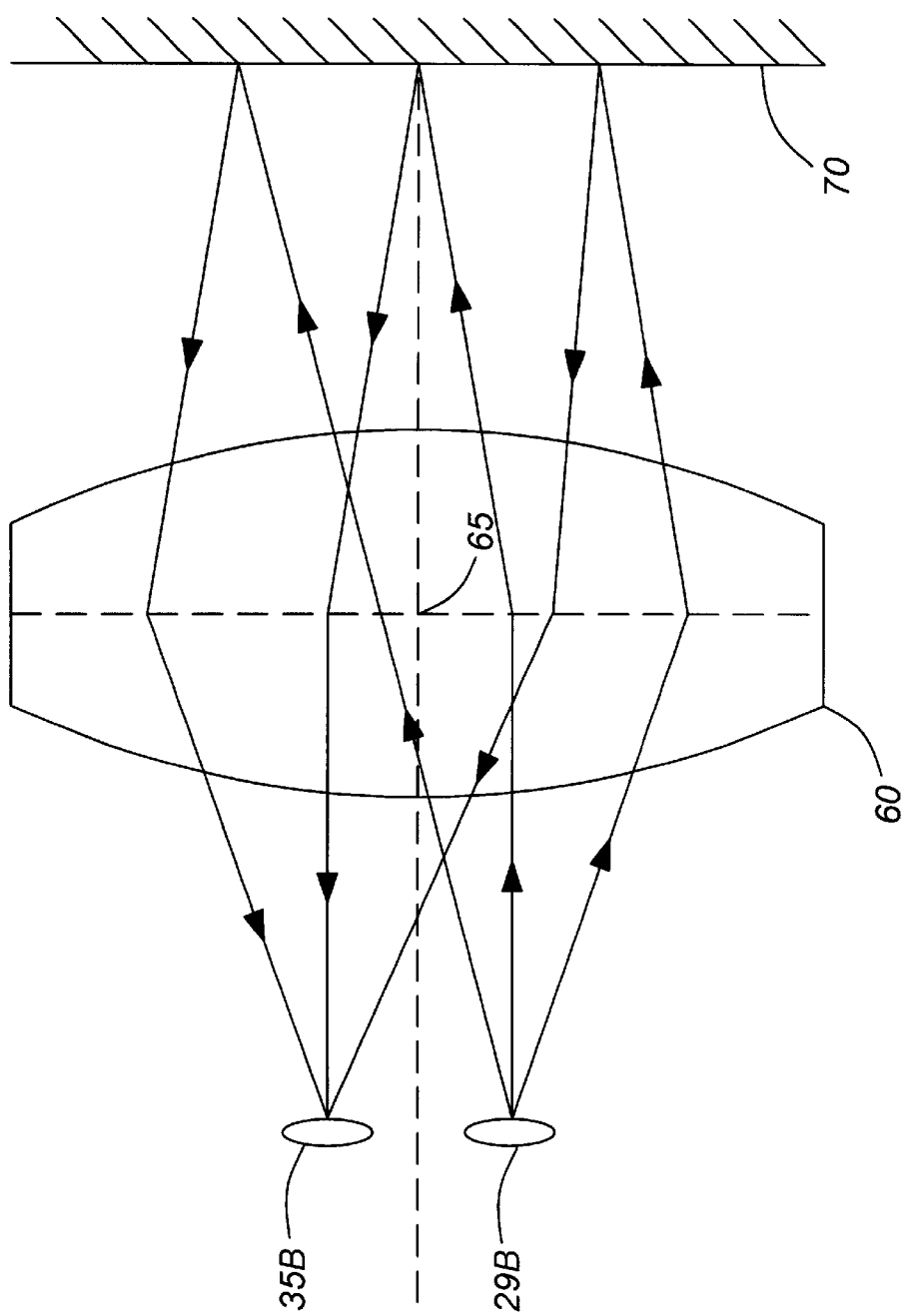
FIG. 1B illustrates the propagation of light through a lens.

FIG. 1B illustrates the propagation of light through a lens. Light 29B transmitted from isolator core 20 to lens 60 is collimated by lens 60 and reflected back to lens 60 by mirror 70. The reflect light 35B focused into isolator core 30 is the mirror image of light beam 29B as discussed below in relation to FIG. 1C.

Figure 1C:
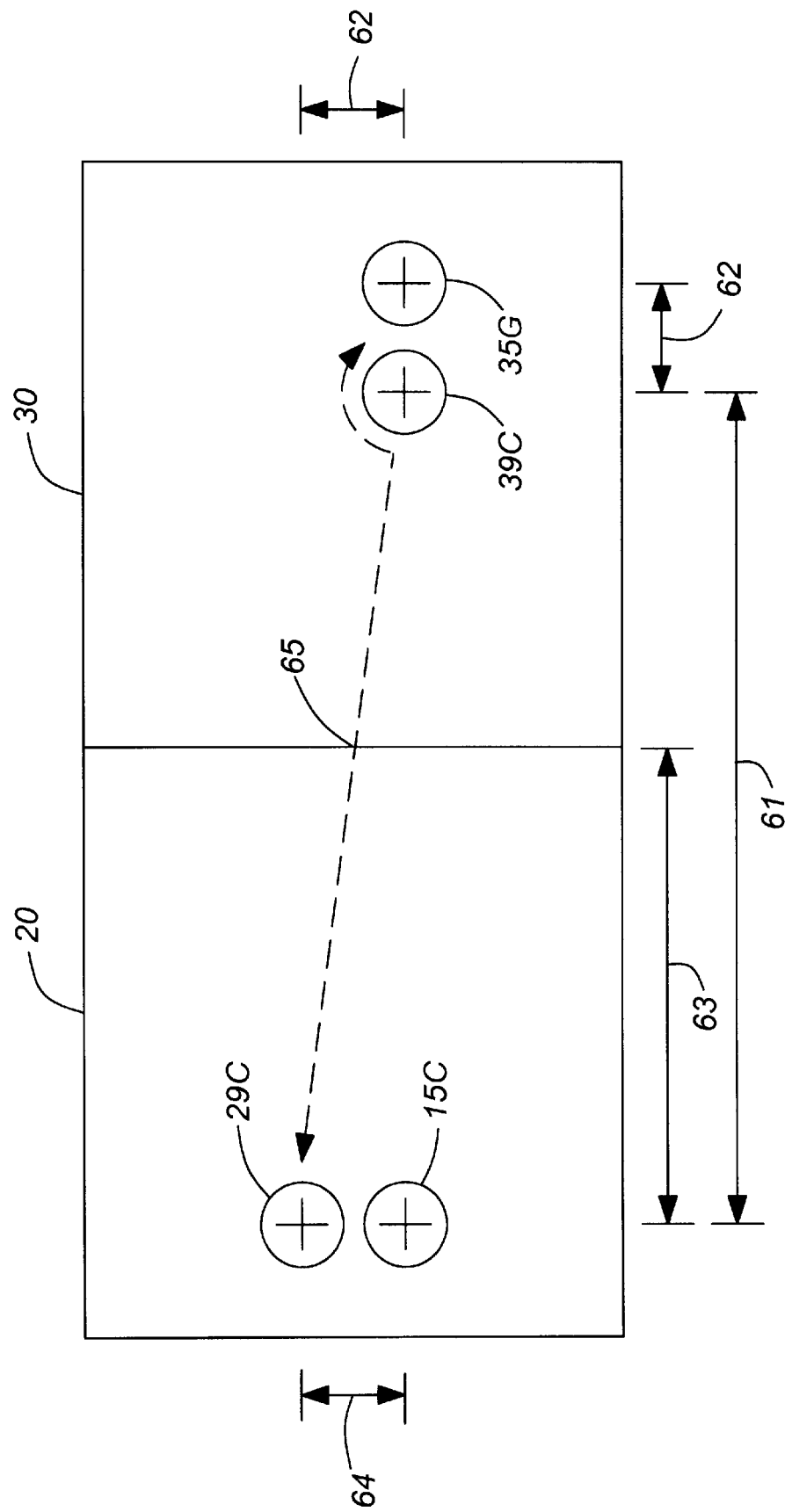
FIG. 1C illustrates a cross-sectional view of the light beam reflection of a mirror.

FIG. 1C illustrates a cross-sectional view of light reflection off a mirror. Light beam position 15C represents the position of a light beam entering/exiting fiber 40. Light beam position 39C represents the position of a light beam entering/exiting fiber 50. The fibers are separated a fixed distance 61 apart. Light beam position 29C represents the position of a light beam as it exits isolator core 20. Light beam position 35C represents the position of a light beam as it enters isolator core 30. Light beam position 29C is offset from light beam position 15C a distance 62 that is equal to the walk-off distance of the walk-off crystals in isolator core 20.

As such, a light beam reflected by mirror 60 will be displaced away from the optical axis 65 in a horizontal direction a distance that is equal to the distance 63 of light beam position 29C from the optical axis 65 of lens 60. The reflected light beam will be displaced away from the optical axis 65 in a vertical direction a distance that is equal to the distance 64 of light beam position 29C from the optical axis 65. In one embodiment, the distance 61 is approximately equal to 250 μm, distance 63 is approximately equal to 140 μm, and distance 62 is approximately equal to 30 μm. It should be noted that a lens and a mirror are well known in the art; accordingly, a more detailed description of their internal composition and their operation is not provided herein.

Figure 2A:
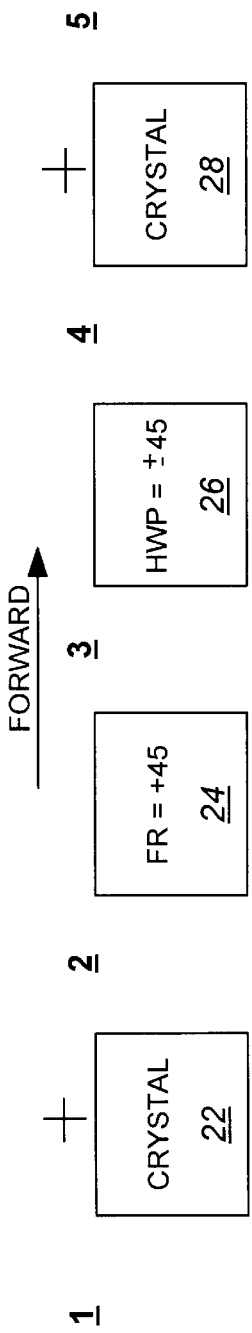
FIG. 2A illustrates cross-sections of the first stage components of one embodiment of an optical isolator.

FIG. 2A illustrates cross-sections of the first stage components of one embodiment of the optical isolator. The cross-sections of the components of isolator core 20 of FIG. 1A are taken along planes perpendicular to the propagation path of a light beam as it travels from fiber 40 to lens 60 of FIG. 1A. The isolator core 20 components are arranged in the same order as shown in FIG. 1A. The walk-off direction for crystals 22 and 28 is shown by (+) and (−) symbols for one embodiment. The walk-off direction for light traveling in the forward direction (from position 1 to position 5) is from (−) to (+). For light travel in the reverse direction, the walk-off direction is from (+) to (−).

Figure 2B:
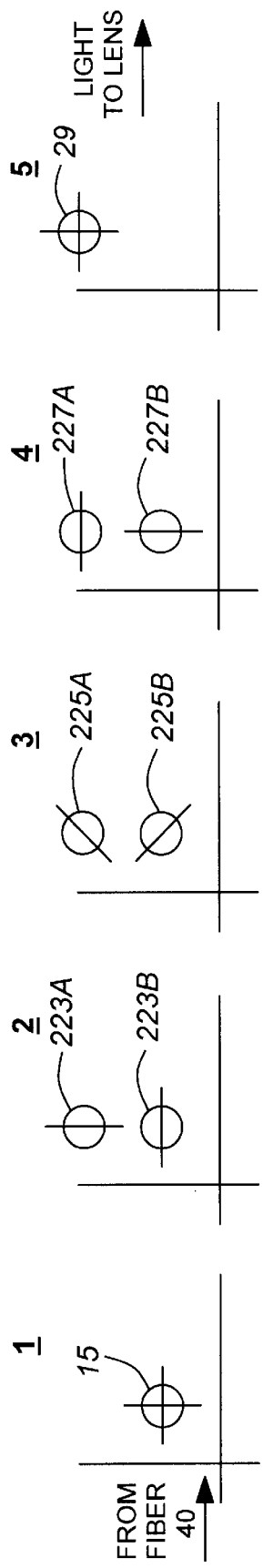
FIG. 2B illustrates the polarization of a light beam as it propagates through one embodiment of a first stage of an isolator in a forward direction.

FIG. 2B illustrates the polarization of a light beam as it propagates through one embodiment of isolator core 20 in a forward direction from position 1 to position 5. The positions 1 through 5 show the polarization effects of the isolator components on light beam 15 as it passes through walk-off crystal 22, Faraday rotator 24, half-wave plate 26, and walk-off crystal 28 in the forward direction. Positions 1 through 5 of FIG. 2B correspond to Positions 1 through 5 of FIG. 2A. In one embodiment, Faraday rotator 24 rotates the plane of polarization of light by approximately 45 degrees in a clockwise direction. In one embodiment, half-wave plate 26 rotates the plane of polarization of light by approximately 45 degrees when light is passed through in a forward direction and by approximately negative 45 degrees when light is passed through in a backward direction.

Light beam 15, transmitted from fiber 40, is split into two orthogonally polarized light beams 223A and 223B by walk-off crystal 22. Light beam 223A is polarized in a plane that is parallel to the walk-off direction of crystal 22 and is offset from light beam 223B by a distance proportional to its thickness. The thickness of the walk-off crystal is selected to divert one of the light beams a distance that will not result in overlap between the light beams. At position 2, light beam 223A is polarized parallel to the walk-off direction of walk-off crystal 22 and light beam 223B is polarized perpendicular to the walk-off direction of walk-off crystal 22.

The Faraday rotator 24 rotates the planes of polarization of light beams 223A and 223B by approximately 45 degrees in a clockwise direction with their resulting planes of polarization shown at position 3 by 225A and 225B, respectively. Half-wave plate 26 rotates the planes of polarization clockwise by approximately an additional 45 degrees resulting in light beams 227A and 227B having polarization planes as shown in position 4. It should be noted that the order of the Faraday rotator and the half-wave plate may be reversed.

In one embodiment, walk-off crystals 22 and 28 are designed to have the same walk-off divergence and direction. At position 4, light beam 227B is polarized in a plane parallel to the walk-off direction of crystal 28. As a result, light beam 227B will be diverted up by the same amount as light beam 223A at position 2. The light beams 227A and 227B are, thus, recombined when passed through walk-off crystal 28 resulting in light beam 29 at position 5. Therefore, in the forward direction, light 15 from fiber 40 will be passed through optical isolator core 20.

The walk-off crystal 28 also functions to reduce polarization mode dispersion effects. When light from fiber 40 is split into two different beams by walk-off crystal 22, the two light beams travel at different velocities. This difference in velocity results in what is known as polarization mode dispersion (PMD). By causing the non-divergent beam 223B in the first walk-off crystal 22 to diverge when passing through the second walk-off crystal 28, the velocities of the two beams are equalized, thereby reducing PMD.

Figure 3A:
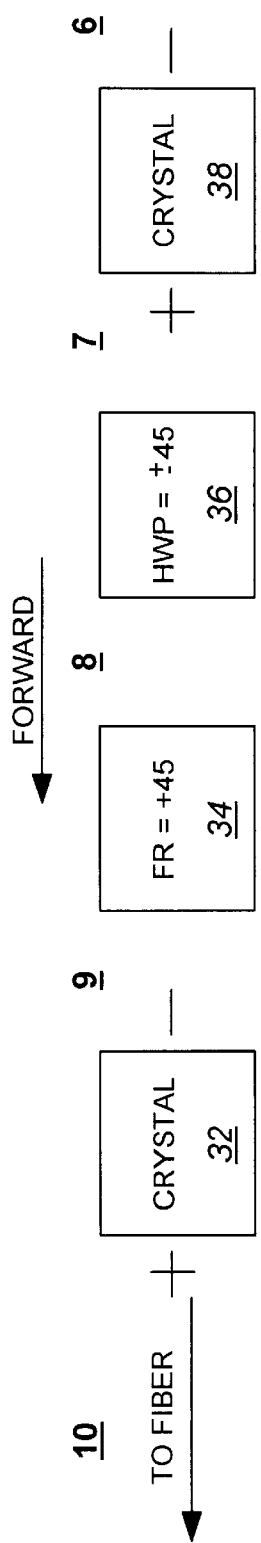
FIG. 3A illustrates cross-sections of the second stage components of one embodiment of the optical isolator.

FIG. 3A illustrates cross-sections of the second stage components of one embodiment of the optical isolator. The cross-sections of the components of isolator core 30 are taken along planes perpendicular to the propagation path of a light beam as it travels from lens 60 to fiber 30. The isolator core 30 components are arranged in the same order as shown in FIG. 1A. The walk-off direction for crystals 32 and 38 is shown by (+) and (−) symbols for which the walk-off direction for light traveling in the forward direction (from position 6 to position 10) is from (−) to (+). For light travel in the reverse direction, the walk-off direction is from (+) to (−).

Figure 3B:
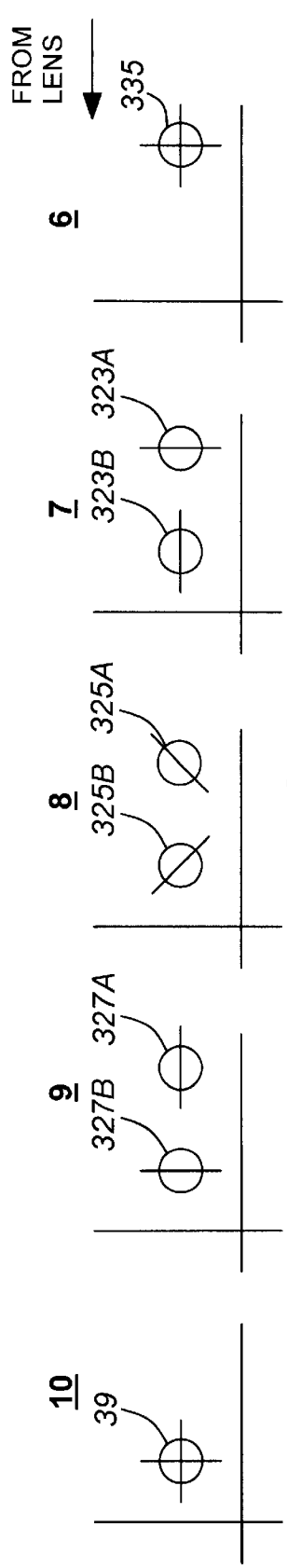
FIG. 3B illustrates the polarization of a light beam as it propagates through an embodiment of a second stage of an isolator in a forward direction.

FIG. 3B illustrates the polarization of a light beam as it propagates through one embodiment isolator core 30 in a forward direction from position 6 to position 10. The positions 6 through 10 show the polarization effects of the isolator components on light beam 35 as it passes through walk-off crystal 38, half-wave plate 36, Faraday rotator 34, and walk-off crystal 32 in the forward direction. Positions 6 through 10 of FIG. 2B correspond to Positions 6 through 10 of FIG. 2A.

As previously discussed above, the mirror image of the light beam 29 exiting isolator core 20 is transmitted to isolator core 30 as light beam 35. Light beam 35 is split into two orthogonally polarized light beams 323A and 323B by walk-off crystal 38. Light beam 223B is polarized in a plane that is parallel to the walk-off direction of crystal 38 and is offset from light beam 223A in the direction of walk-off from (−) to (+) by a distance proportional to its thickness as described above. At position 7, light beam 323B is polarized parallel to the walk-off direction of walk-off crystal 38 and light beam 323A is polarized perpendicular to the walk-off direction of walk-off crystal 38.

Half-wave plate 36 rotates polarization planes clockwise by approximately 45 degrees resulting in light beams 325A and 325B having polarization planes as shown in position 8. The Faraday rotator 34 rotates the planes of polarization of light beams 325A and 325B by approximately an additional 45 degrees in the clockwise direction with their resulting planes of polarization shown at position 9 as 327A and 327B, respectively. It should be noted that the order of the Faraday rotator and the half-wave plate may be reversed.

In one embodiment, walk-off crystals 38 and 32 are designed to have the same walk-off divergence in the same direction. At position 9, light beam 327A is polarized in a plane parallel to the walk-off direction (left) of crystal 32. As a result, light beam 327A will be diverted in the opposite direction and by the same amount as light beam 323B at position 7. The light beams 327A and 327B are, thus, recombined when passed through walk-off crystal 32 resulting in light beam 39 at position 10 that is aligned to intercept fiber 50. Therefore, in the forward direction, light originating from fiber 40 will be passed through optical isolator 10 to fiber 50. By using a pair of walk-off crystals in the second isolator 30 having walk-off directions at 90 degrees relative to the walk-off crystals in the first isolator 20, the light propagated through isolator 10 may be adjusted to intercept fiber 50.

Figure 3C:
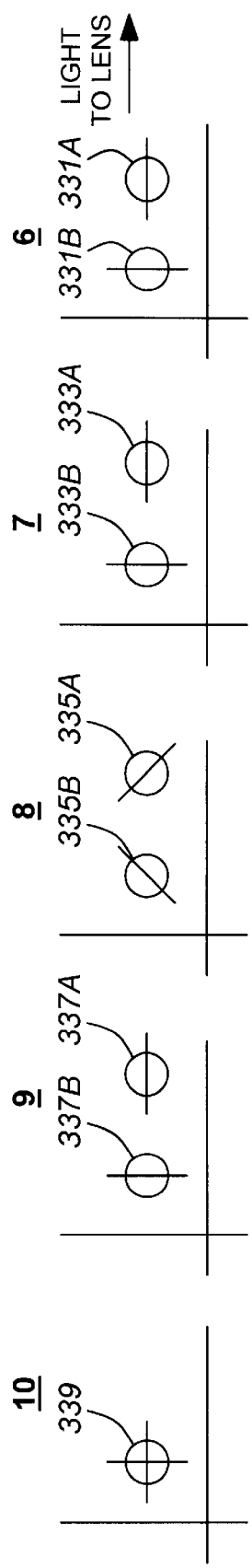
FIG. 3C illustrates the polarization states of light beams as they propagates through an embodiment of a second stage of an isolator in a reverse direction.

FIG. 3C illustrates the polarization states of a light beam as it propagates through one embodiment of isolator core 30 in a reverse direction from position 10 to position 6. Light beam 339, transmitted from fiber 50, is split into two orthogonally polarized light beams 337A and 337B by walk-off crystal 32. Light beam 337A is polarized in a plane that is parallel to the walk-off direction of crystal 32 and is offset from light beam 337B by a distance proportional to its thickness. At position 9, light beam 337A is polarized parallel to the walk-off direction of walk-off crystal 32 and light beam 337B is polarized perpendicular to the walk-off direction of walk-off crystal 32.

The Faraday rotator 34 rotates the planes of polarization of light beams 337A and 337B by approximately 45 degrees in a clockwise direction with their resulting planes of polarization shown at position 8 by 335A and 335B, respectively. Half-wave plate 36 is a reciprocal device that rotates the planes of polarization counterclockwise by approximately 45 degrees resulting in light beams 333A and 333B having polarization planes as shown in position 7.

At position 7, light beam 333A is polarized in a plane parallel to the walk-off direction of crystal 38 and is diverted in the direction from (+) to (−) as it passes through crystal 38. After passing through walk-off crystal 38, the two light beams 331A and 331B, at position 5, are displaced with respect to the initial position 339. As a result, light passed through isolator 30 in a reverse direction is isolated from the initial position of light 35 propagated through the isolator in a forward direction. Light beams 331A and 331B are reflected by mirror 60 to isolator 20 of FIG. 1A.

Figure 2C:
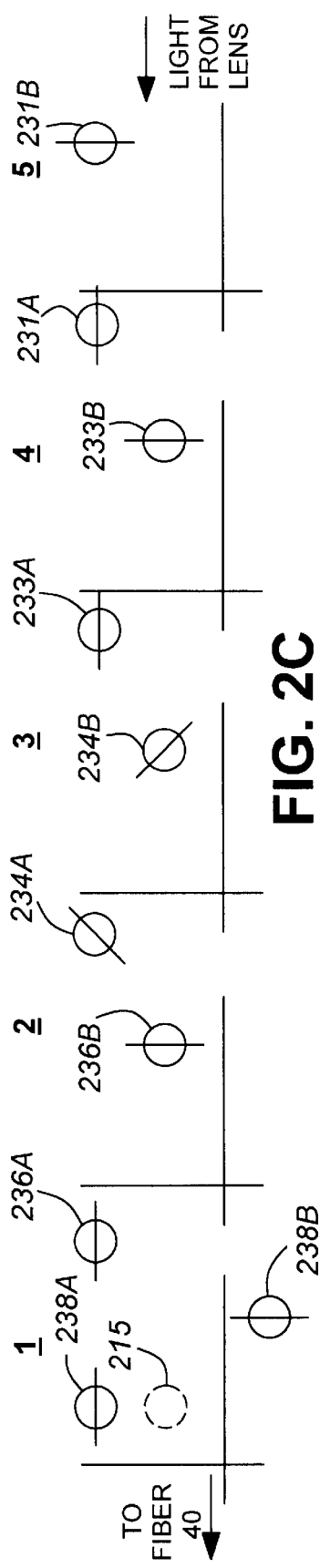
FIG. 2C illustrates the polarization states of a light beam as it propagates through one embodiment of a first stage of an isolator in a reverse direction.

FIG. 2C illustrates the polarization states of light beams as it propagates through one embodiment of isolator core 20 in a reverse direction from position 5 to position 1. Light beams 231A and 231B represent reflected light beams 331A and 331B, respectively, received from isolator 30 as discussed above with respect to FIG. 1C. Light beam 233B is polarized in a plane that is parallel to the walk-off direction of crystal 28 and is offset in the walk-off direction by a distance proportional to the thickness of crystal 28. At position 4, light beam 233A is polarized perpendicular to the walk-off direction of walk-off crystal 28 and light beam 233B is polarized parallel to the walk-off direction of walk-off crystal 28.

Half-wave plate 26 is a reciprocal device that rotates the planes of polarization of light beams 233A and 233B counterclockwise by approximately 45 degrees resulting in light beams 234A and 234B, respectively, having polarization planes as shown in position 3. The Faraday rotator 24 is a non-reciprocal device that rotates the planes of polarization of light beams 234A and 234B by approximately 45 degrees in a clockwise direction with their resulting planes of polarization shown at position 3 as light beams 236A and 236B, respectively. As such, the polarization planes of light beams 236A and 236B are oriented similar to light beams 233A and 233B, respectively.

At position 2, light beam 236B is polarized in a plane parallel to the walk-off direction of crystal 22 and is diverted in the direction from (+) to (−) as it passes through crystal 22. The dash circle 215 indicates the original position of light beam 15 of FIG. 2B received from fiber 40. After passing through walk-off crystal 22, the two light beams 238A and 238B, at position 1, are displaced with respect to the initial position 215. As a result, light reflections passed through isolator 20 in the reverse direction do not intercept the input fiber 40. By using a two-stage optical isolator, the polarization leakage of a light from fiber 50 may be further inhibited from transmission back to fiber 40.

Referring again to FIG. 1A, the mode field diameter of the light beams expands as it propagates through the optical isolator from fiber 40 to fiber 50. As such, the fibers must be spaced far enough apart to accommodate the expanded mode field diameter. In one embodiment, fibers 40 and 50 are single mode fibers having step index core profiles with a numerical aperture (NA) of approximately 0.1 and mode field diameters of approximately 10 μm at 1550 nm. Single mode fibers may be obtained from optical fiber manufactures, for example, Corning of Corning, N.Y. The fibers 40 and 50 are aligned next to each other such that their core centers are spaced 250 μm apart. In another embodiment, a TEMC fiber may be used having non-spacer cores to separate the core centers 250 μm apart. Lens 60 is selected to have off axis length of 125 μm in order to couple light between the isolator cores 20 and 30 and the mirror 70 as discussed above in relation to FIG. 1B.

The expansion of the mode field diameter of the light beam through the isolator can be determined by calculating the effective air thickness $n_{eff}$ of the isolator using the thickness and indices of refraction (n) of each of the isolator components. For example, in one embodiment, the isolator consists of two rutile crystals each 0.3 millimeters (mm) thick with n=2.4, a Faraday rotator 0.36 mm thick with n=2.2, and a half-wave plate 0.09 mm thick with n=1.5. The effective air thickness of the two rutile crystals is approximately 600 μm/2.4=250 μm. The effective air thickness of the Faraday rotator is approximately 360 μm/2.2=164 μm. The effective air thickness of the half-wave plate is approximately 90 μm/1.5=60 μm. Therefore, the total effective air thickness of the isolator is approximately 250 μm+164 μm+60 μm=474 μm.

The mode field diameter of the beam may be approximated as the mode field diameter of the fiber plus the mode field diameter of the isolator. The mode field diameter of the isolator may be approximated as twice the numerical aperture multiplied by the total effective air thickness of the isolator. As a result, for one embodiment, the mode field diameter of the beam may be approximately 104.8 μm. By using a walk-off crystal with a high index of refraction, a lower effective air thickness is obtained, thereby allowing for a smaller fiber separation.

It should be noted that the optical isolator cores are not limited to only the crystals, half-wave plate, and Faraday rotator configurations illustrated in FIGS. 2 through 3. In another embodiment, the optical isolator includes crystals, half-wave plates, and Faraday rotators of other configurations to propagate light between fibers in one direction and inhibit light propagation in the opposite direction.

FIG. 7A illustrates cross-sections of the first stage components of another embodiment of an optical isolator. The cross-sections of the components of isolator core 20 of FIG. 1A are taken along planes perpendicular to the propagation path of a light beam as it travels from fiber 20 to lens 60 of FIG. 1A. The isolator core 20 components are arranged in the same order as shown in FIG. 1A. The walk-off direction for crystals 22 and 28 is shown by (+) and (−) symbols for one embodiment. The walk-off direction for light traveling in the forward direction (from position 1 to position 5) is from (−) to (+). For light travel in the reverse direction, the walk-off direction is from (+) to (−).

FIG. 7B illustrates the polarization of a light beam as it propagates through another embodiment of isolator core 20 in a forward direction from position 1 to position 5. The positions 1 through 5 show the polarization effects of the isolator components on light beam 715 as it passes through walk-off crystal 22, Faraday rotator 24, half-wave plate 26, and walk-off crystal 28 in the forward direction. Positions 1 through 5 of FIG. 7B correspond to Positions 1 through 5 of FIG. 7A. In one embodiment, Faraday rotator 24 rotates the plane of polarization of light by approximately 45 degrees in a counterclockwise direction. In one embodiment, half-wave plate 26 rotates the plane of polarization of light by approximately 45 degrees when light is passed through in a forward direction and by approximately negative 45 degrees when light is passed through in a backward direction.

Light beam 715, transmitted from fiber 40, is split into two orthogonally polarized light beams 723A and 723B by walk-off crystal 22. Light beam 723A is polarized in a plane that is parallel to the walk-off direction of crystal 22 and is offset from light beam 723B by a distance proportional to its thickness. The thickness of the walk-off crystal is selected to divert one of the light beams a distance that will not result in overlap between the light beams. At position 2, light beam 723A is polarized parallel to the walk-off direction of walk-off crystal 22 and light beam 723B is polarized perpendicular to the walk-off direction of walk-off crystal 22.

The Faraday rotator 24 rotates the planes of polarization of light beams 723A and 723B by approximately 45 degrees in a counterclockwise direction with their resulting planes of polarization shown at position 3 by 725A and 725B, respectively. Half-wave plate 26 rotates the planes of polarization clockwise by approximately 45 degrees resulting in light beams 727A and 727B having polarization planes as shown in position 4. It should be noted that the order of the Faraday rotator and the half-wave plate may be reversed.

In one embodiment, walk-off crystals 22 and 28 are designed to have the same walk-off divergence in different directions. At position 4, light beam 727A is polarized in a plane parallel to the walk-off direction of crystal 28. As a result, light beam 727A will be diverted down by the same amount as light beam 723A is diverted up at position 2. The light beams 727A and 727B are, thus, recombined when passed through walk-off crystal 28 resulting in light beam 729 at position 5. Therefore, in the forward direction, light 715 from fiber 40 will be passed through optical isolator core 20 of FIG. 1A.

FIG. 8A illustrates cross-sections of the second stage components of another embodiment of the optical isolator. The cross-sections of the components of isolator core 30 are taken along planes perpendicular to the propagation path of a light beam as it travels from lens 60 to fiber 30 of FIG. 1A. The isolator core 30 components are arranged in the same order as shown in FIG. 1A. The walk-off direction for crystals 32 and 38 is shown by (+) and (−) symbols for one embodiment. The walk-off direction for light traveling in the forward direction (from position 6 to position 10) is from (−) to (+). For light travel in the reverse direction, the walk-off direction is from (+) to (−).

FIG. 8B illustrates the polarization of a light beam as it propagates through another embodiment of isolator core 30 in a forward direction from position 6 to position 10. The positions 6 through 10 show the polarization effects of the isolator components on light beam 835 as it passes through walk-off crystal 38, half-wave plate 36, Faraday rotator 34, and walk-off crystal 32 in the forward direction. Positions 6 through 10 of FIG. 8B correspond to Positions 6 through 10 of FIG. 8A. In one embodiment, Faraday rotator 24 rotates the plane of polarization of light by approximately 45 degrees in a counterclockwise direction. In one embodiment, half-wave plate 26 rotates the plane of polarization of light by approximately 45 degrees when light is passed through in a forward direction and by approximately negative 45 degrees when light is passed through in a backward direction.

Light transmitted to lens 60 of FIG. 1A is collimated by the lens 60 and reflected back to the lens 60 to be focused into isolator 30 as discussed above in relation to FIGS. 1A through 1C. As such, the light beam 835 is reflected to lens 60 as the mirror image of light beam 729.

Referring again to FIG. 8B, light beam 835 is split into two orthogonally polarized light beams 823A and 823B by walk-off crystal 38. Light beam 823B is polarized in a plane that is parallel to the walk-off direction of crystal 38 and is offset from light beam 823A in the direction of walk-off from (−) to (+) by a distance proportional to its thickness as described above. At position 7, light beam 823B is polarized parallel to the walk-off direction of walk-off crystal 38 and light beam 823A is polarized perpendicular to the walk-off direction of walk-off crystal 38.

Half-wave plate 36 rotates polarization planes clockwise by approximately 45 degrees resulting in light beams 825A and 825B having polarization planes as shown in position 8. The Faraday rotator 34 rotates the planes of polarization of light beams 825A and 825B by approximately 45 degrees in the counterclockwise direction with their resulting planes of polarization shown at position 9 as 827A and 827B, respectively. It should be noted that the order of the Faraday rotator and the half-wave plate may be reversed.

In one embodiment, walk-off crystals 38 and 32 are designed to have the same walk-off divergence in different directions. At position 9, light beam 827B is polarized in a plane parallel to the walk-off direction of crystal 32. As a result, light beam 827B will be diverted in the opposite direction and by the same amount as light beam 823B at position 7. The light beams 827A and 827B are, thus, recombined when passed through walk-off crystal 32 resulting in light beam 839 at position 10 that is aligned to intercept fiber 50 of FIG. 1A. Therefore, in the forward direction, light originating from fiber 40 will be passed through optical isolator 10 to fiber 50 of FIG. 1A. By using a pair of walk-off crystals in the second isolator 30 having walk-off directions at 90 degrees relative to the walk-off crystals in the first isolator 20, the light propagated through isolator 10 may be adjusted to intercept fiber 50.

FIG. 8C illustrates the polarization states of a light beam as it propagates through another embodiment of an isolator core 30 in a reverse direction from position 10 to position 6. Light beam 839, transmitted from fiber 50 of FIG. 1A, is split into two orthogonally polarized light beams 837A and 837B by walk-off crystal 32. Light beam 837B is polarized in a plane that is parallel to the walk-off direction of crystal 32 and is offset from light beam 837A by a distance proportional to its thickness. At position 9, light beam 837B is polarized parallel to the walk-off direction of walk-off crystal 32 and light beam 837A is polarized perpendicular to the walk-off direction of walk-off crystal 32.

The Faraday rotator 34 rotates the planes of polarization of light beams 837A and 837B by approximately 45 degrees in a counterclockwise direction with their resulting planes of polarization shown at position 8 by 835A and 835B, respectively. Half-wave plate 36 is a reciprocal device that rotates the planes of polarization counterclockwise by approximately 45 degrees resulting in light beams 833A and 833B having polarization planes as shown in position 7.

At position 7, light beam 833A is polarized in a plane parallel to the walk-off direction of crystal 38 and is diverted in the direction from (+) to (−) as it passes through crystal 38. After passing through walk-off crystal 38, the two light beams 831A and 831B, at position 5, are displaced with respect to the initial position 839. As a result, light passed through isolator 30 in a reverse direction is isolated from the initial position of light 835 propagated through the isolator in a forward direction. Light beams 831A and 831B are reflected by mirror 60 to isolator 20 of FIG. 1A.

FIG. 7C illustrates the polarization states of light beams as it propagates through another embodiment of isolator core 20 in a reverse direction from position 5 to position 1. Light beams 731A and 731B represent reflected light beams 831A and 831B, respectively, received from isolator 30 as discussed above with respect to FIG. 1C. Light beam 733B is polarized in a plane that is parallel to the walk-off direction of crystal 28 and is offset in the walk-off direction by a distance proportional to the thickness of crystal 28. At position 4, light beam 733A is polarized perpendicular to the walk-off direction of walk-off crystal 28 and light beam 733B is polarized parallel to the walk-off direction of walk-off crystal 28.

Half-wave plate 26 is a reciprocal device that rotates the planes of polarization of light beams 733A and 733B counterclockwise by approximately 45 degrees resulting in light beams 734A and 734B, respectively, having polarization planes as shown in position 3. The Faraday rotator 24 is a non-reciprocal device that rotates the planes of polarization of light beams 734A and 734B by approximately 45 degrees in a counterclockwise direction with their resulting planes of polarization shown at position 3 as light beams 736A and 736B, respectively.

At position 2, light beam 736A is polarized in a plane parallel to the walk-off direction of crystal 22 and is diverted in the direction from (+) to (−) as it passes through crystal 22. The dash circle 715 indicates the original position of light beam 715 of FIG. 7B received from fiber 40 of FIG. 1A. After passing through walk-off crystal 22, the two light beams 738A and 738B, at position 1, are displaced with respect to the initial position 715. As a result, light reflections passed through isolator 20 in the reverse direction do not intercept the input fiber 40 of FIG. 1A. By using a two-stage optical isolator, the polarization leakage of a light from fiber 50 of FIG. 1A may be further inhibited from transmission back to fiber 40 of FIG. 1A.

In yet another embodiment, the optical isolator consists of a single stage where one of the isolator cores is replaced with an isotropic spacer crystal. The spacer crystal is a non-birefringent crystal that does not operate to split a light beam. The spacer crystal is used to separate the two fibers without having a polarization effect on the light beam transmitted between the fibers. In one embodiment, the spacer crystal is constructed from lithium niobate. In another embodiment, the spacer crystal may be constructed from other isotropic crystals with an equivalent air thickness and index of refraction to approximately match the isolator core.

Figure 4A:
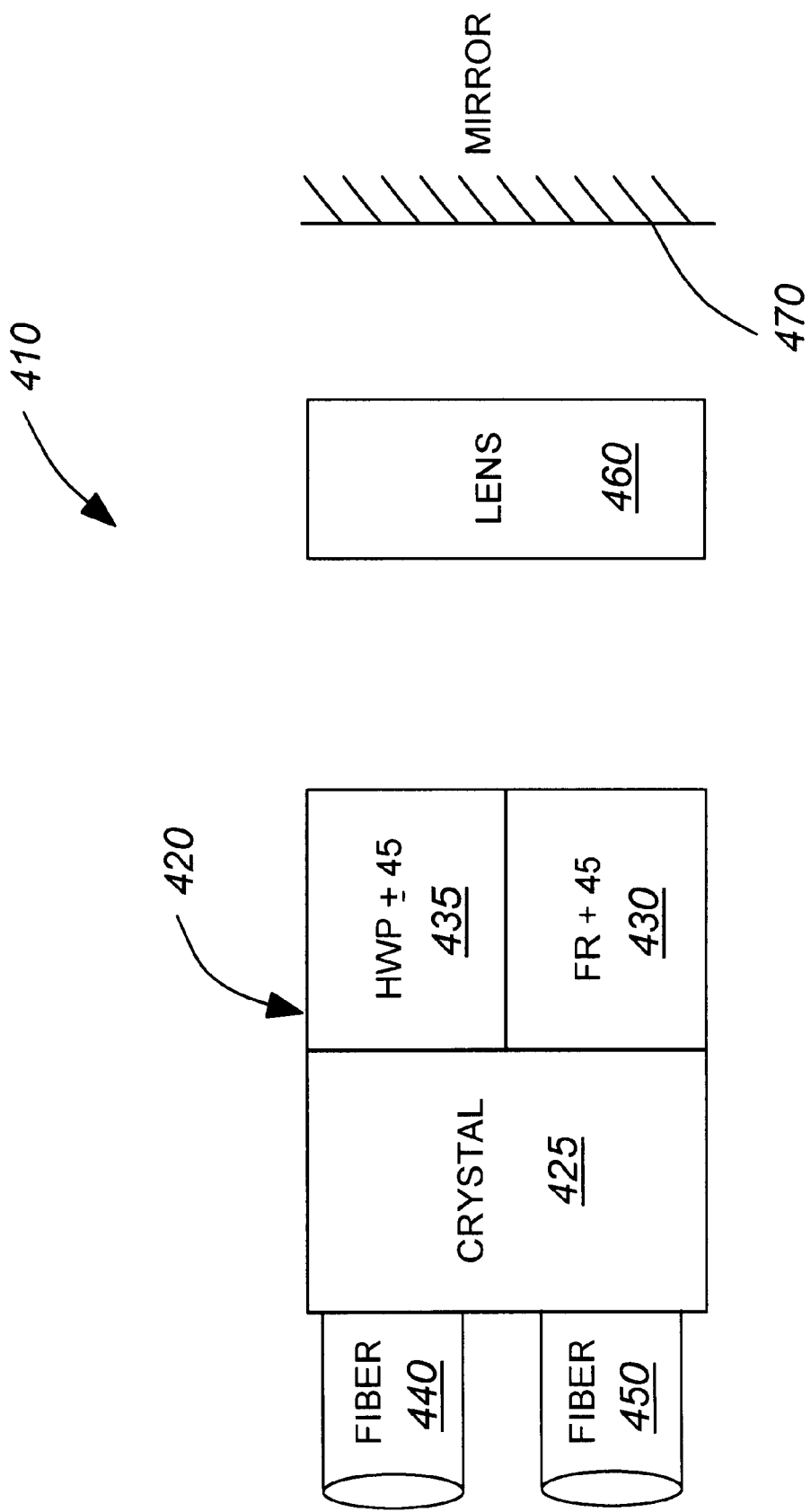
FIG. 4A illustrates an alternative embodiment of an optical isolator.

FIG. 4A illustrates an alternative embodiment of an optical isolator. Optical isolator 410 is a single stage isolator that includes a single isolator core 420 placed in front of fibers 440 and 450. Lens 460 and a mirror 470 are positioned on the side of isolator core 420 opposite that of fibers 440 and 450. Optical isolator 410 operates to transmit light from fiber 440 to fiber 450, while inhibiting the transmission of light from fiber 450 to fiber 440.

In one embodiment, isolator core 420 includes a walk-off crystal 425, a Faraday rotator 430, and a half-wave plate 435. The internal operation of walk-off crystal 425, Faraday rotator 430, and half-wave plate 435 is similar to the internal operation of the walk-off crystal, the Faraday rotator, and the half-wave plate described above with respect to FIG. 1A.

Figure 4B:
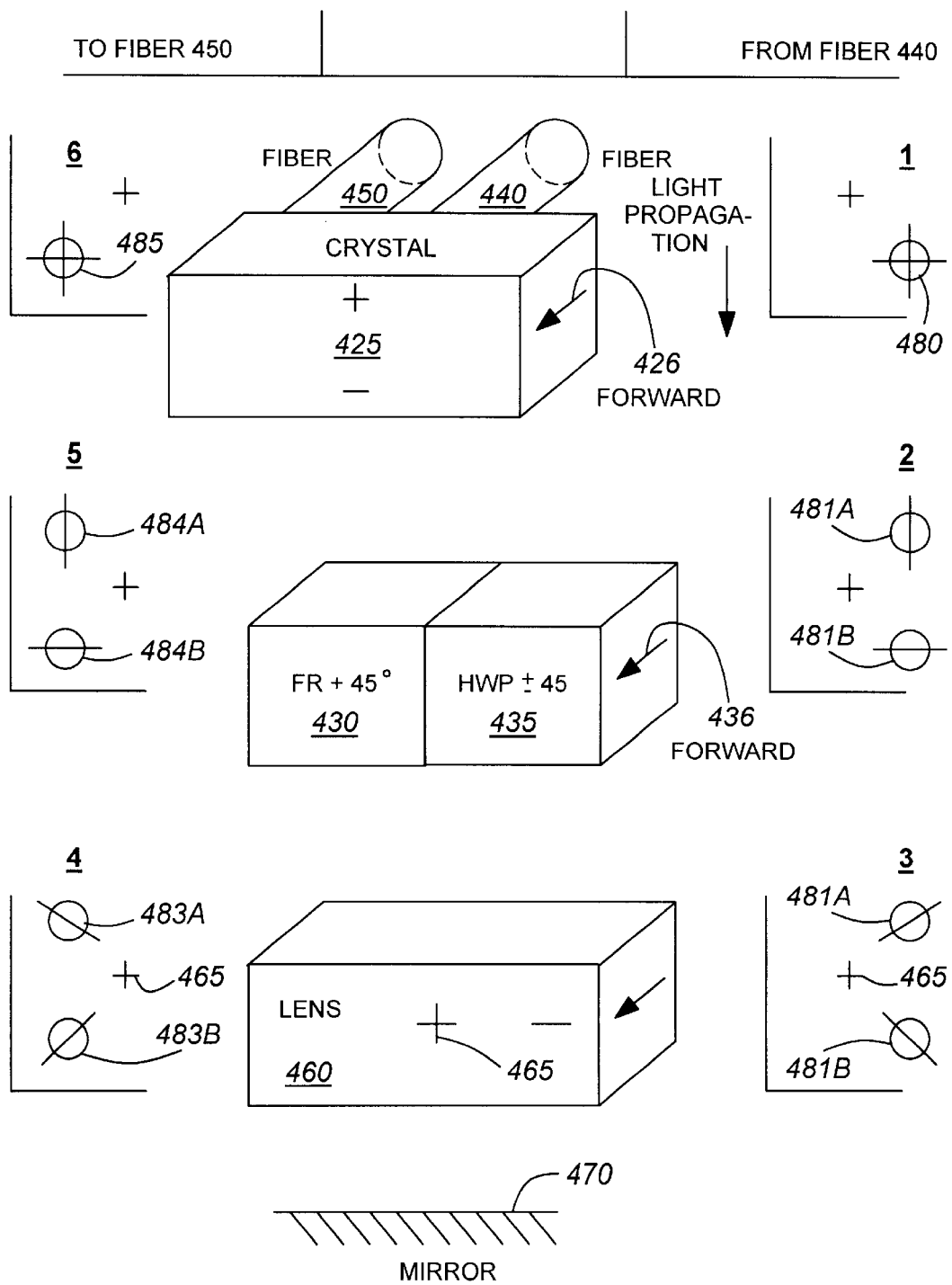
FIG. 4B illustrates the polarization of a light beam as it propagates in one direction through an alternative embodiment of an optical isolator.

FIG. 4B illustrates the polarization of a light beam as it propagates in one direction through one embodiment of an optical isolator. The isolator core 420 components are arranged in the same order as shown in FIG. 4A. It should be noted that the isolator components are shown as physically separated for ease of illustrating the polarization states of the light beams in between the components. It should also be noted that the isolator components and the polarizations are not drawn to scale.

In one embodiment, the walk-off direction for crystal 425 is shown by (+) and (−) symbols for which the walk-off direction for light traveling in the forward direction 426 is from (−) to (+). For light travel in the reverse direction, the walk-off direction is from (+) to (−). In an alternative embodiment, crystal 425 may include two walk-off crystals having walk-off directions perpendicular to each other.

The forward direction 436 of the half-wave plate 435 is the direction for which the planes of polarization are rotated clockwise. For light propagating through half-wave plate 435 in a reverse direction, the planes of polarization are rotated counterclockwise.

The direction of light propagation in FIG. 4B is from fiber 440 to fiber 450. The positions 1 through 6 show the polarization effects of the isolator components on light beam 480 as it passes, in sequence, through walk-off crystal 425, half-wave plate 435, lens 460, mirror 470, Faraday rotator 430 and walk-off crystal 425.

Light beam 480 transmitted from fiber 440 is split into two orthogonally polarized light beams 481A and 481B by walk-off crystal 425. Light beam 481A is polarized in a plane that is parallel to the walk-off direction of crystal 425 and is offset from light beam 481B by a distance proportional to its thickness as described above. At position 2, light beam 481A is polarized parallel to the walk-off direction of walk-off crystal 425 and light beam 481B is polarized perpendicular to the walk-off direction of walk-off crystal 425.

Half-wave plate 435 rotates the planes of polarization of light beams 481A and 481B clockwise by approximately 45 degrees resulting in light beams 482A and 482B, respectively, having polarization planes as shown in position 3. The light beams 482A and 482B propagate to lens 460 where they are collimated and reflected by mirror 470 back to lens 460. The light beam reflections are the mirror image of the incident light beams. As such, the light beams 483A and 483B are displaced away from the optical axes 465 of lens 460 a distance that is equal to the distance of light beams 482A and 482B, respectively, from the optical axes 465 of lens 460 as shown in position 4.

The Faraday rotator 430 rotates the planes of polarization of light beams 483A and 483B by approximately 45 degrees in a clockwise direction with their resulting planes of polarization shown at position 5 as 484A and 484B, respectively. At position 5, light beam 484A is polarized in a plane parallel to the walk-off direction of crystal 425. As a result, light beam 484A will be diverted in the direction from (+) to (−) by the same divergence distance as light beam 481A at position 2. The light beams 484A and 484B are, thus, recombined when passed through walk-off crystal 425 resulting in light beam 485 at position 5. In this manner, in the forward direction, light beam 480 from fiber 440 will be passed through optical isolator core 420 to fiber 450. In addition, the effect of the lens 460 and mirror 470 is to switch the polarization components that walk-off when propagated through walk-off crystal 425 a second time, thereby possibly avoiding PMD.

Figure 4C:
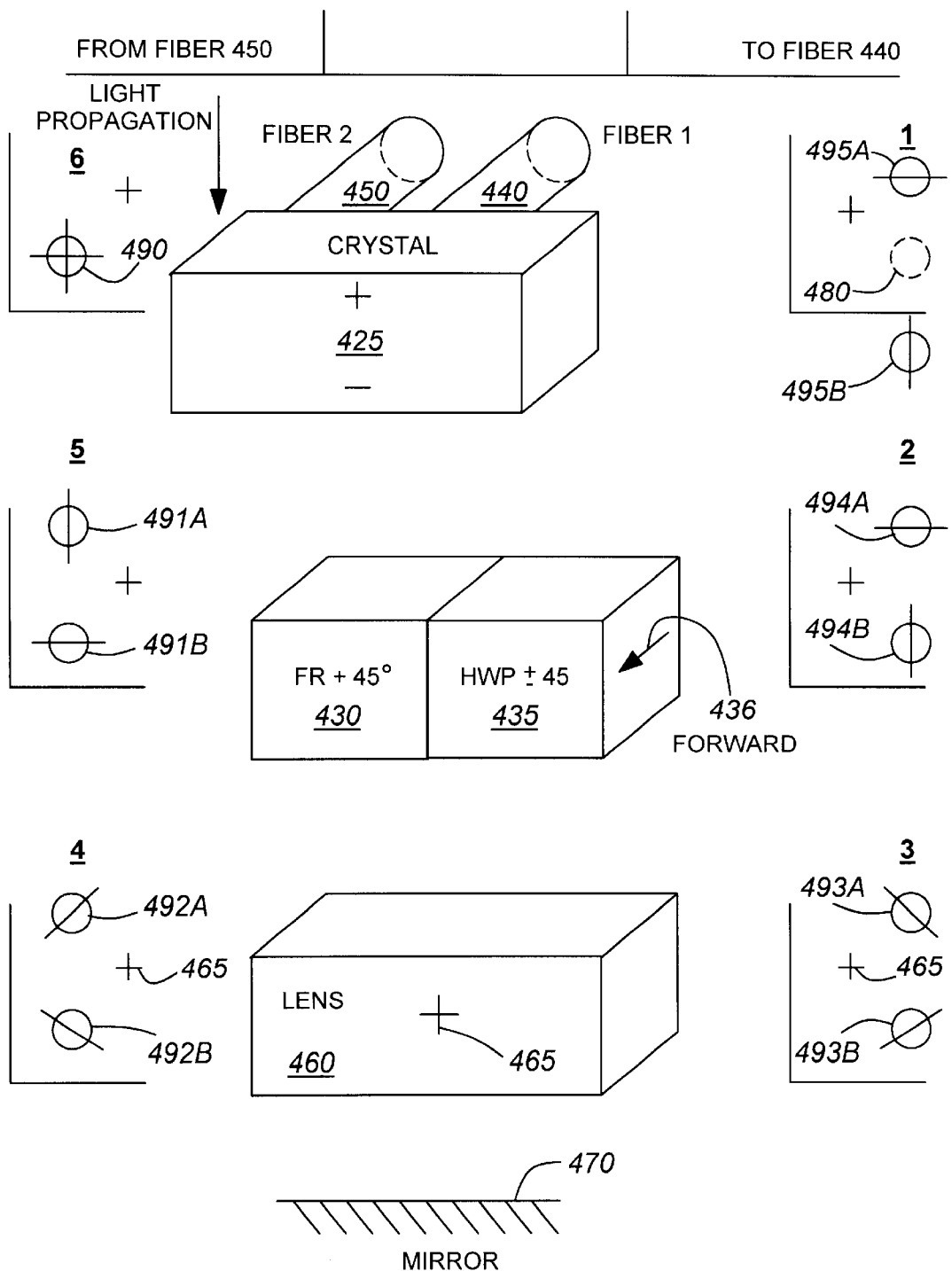
FIG. 4C illustrates the polarization of a light beam as it propagates in another direction through an alternative embodiment of an optical isolator.

FIG. 4C illustrates the polarization of a light beam as it propagates in another direction through one embodiment of an optical isolator. The direction of light propagation is from fiber 450 to fiber 440. The positions 6 through 1 show the polarization effects of the isolator components on light beam 490 as it passes, in sequence, through walk-off crystal 425, Faraday rotator 430, lens 460, mirror 470, lens 460, half-wave plate 435, and walk-off crystal 425.

Light beam 490 transmitted from fiber 450 is split into two orthogonally polarized light beams 491A and 491B by walk-off crystal 425. Light beam 491A is polarized in a plane that is parallel to the walk-off direction of crystal 425 and is offset from light beam 491B by a distance proportional to the thickness of the walk-off crystal, as described above. At position 5, light beam 491A is polarized parallel to the walk-off direction of walk-off crystal 425 and light beam 491B is polarized perpendicular to the walk-off direction of walk-off crystal 425.

The Faraday rotator 430 rotates the planes of polarization of light beams 491A and 491B by approximately 45 degrees in a clockwise direction with their resulting planes of polarization shown at position 4 as 492A and 492B, respectively. The non-reciprocal operation of the Faraday rotator 430 rotates the polarization planes of light beams to an orientation such that light beams are not ultimately recombined when passed back through walk-off crystal 425 as discussed below.

The light beams 492A and 492B propagate to lens 460 where they are collimated by lens 460 and reflected by mirror 470 back to lens 460. The light reflections are the mirror image of the incident light beams. As such, light beams 493A and 493B are displaced away from the optical axes 465 of lens 460 a distance that is equal to the distance of light beams 492A and 492B, respectively, from the optical axes 465 of lens 460 as shown in position 3. Lens 460 focuses the reflected light beams to half-wave plate 435.

Half-wave plate 435 rotates the planes of polarization of light beams 493A and 493B counterclockwise by approximately 45 degrees resulting in light beams 494A and 494B having polarization planes as shown in position 2. At position 2, light beam 494B is polarized in a plane parallel to the walk-off direction of crystal 425 and is diverted from (+) to (−) as it passes through walk-off crystal 425. As a result, light beams 494A and 494B are offset relative to the position (dashed circle) of the original light beam 480 of FIG. 4B and, thus, are not transmitted to fiber 440. In this manner, light from fiber 450 is isolated from fiber 440. It should be noted that the positions of the Faraday rotator and the half-wave plate in the isolator may be reversed with the isolation of light between the fibers correspondingly reversed.

Figure 5A:
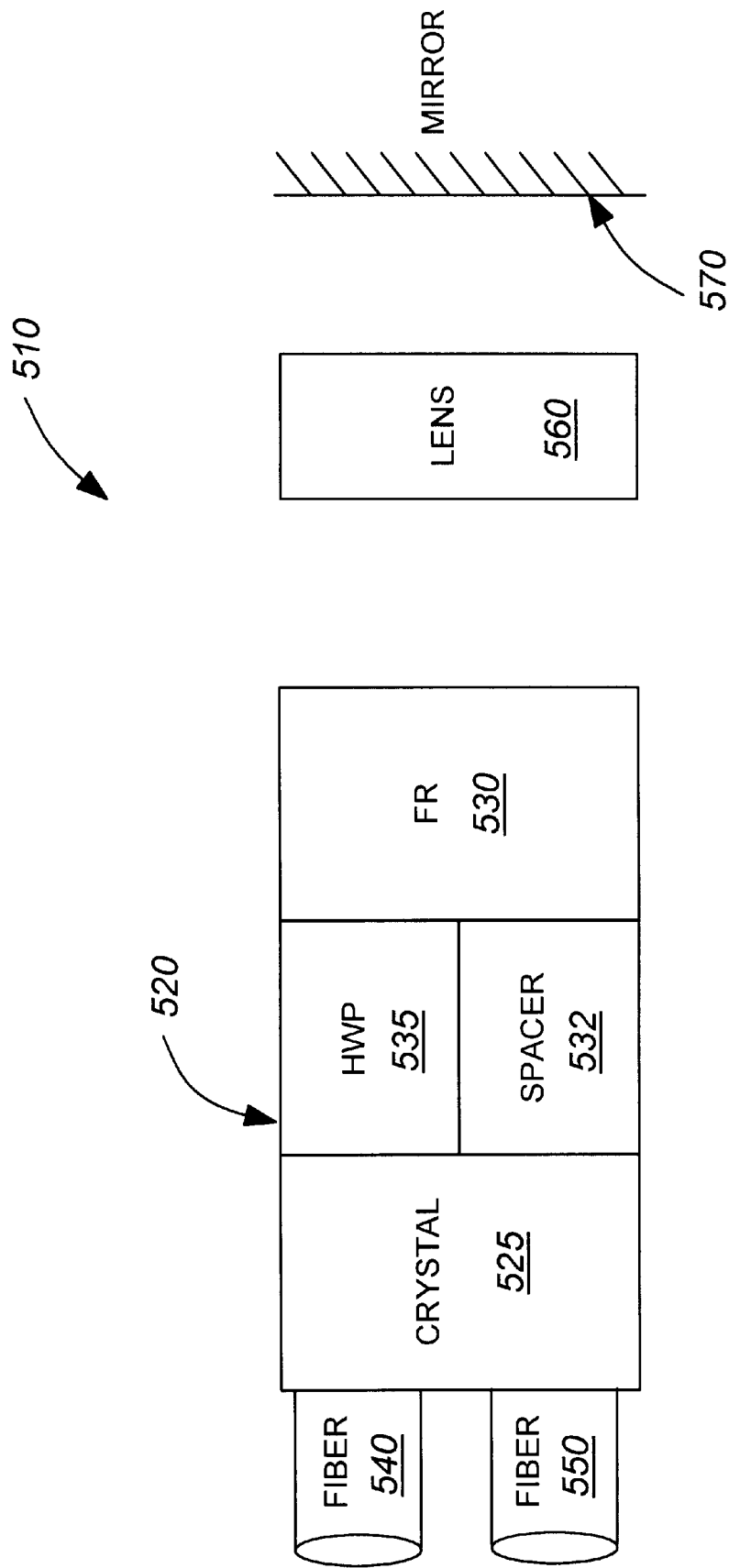
FIG. 5A illustrates another alternative embodiment of an optical isolator.

FIG. 5A illustrates an alternative embodiment of an optical isolator. Optical isolator 510 is a single stage isolator that includes a single isolator core 520 placed in front of fibers 540 and 550. Lens 560 and a mirror 570 are positioned on the side of isolator core 520 opposite that of fibers 540 and 550. Optical isolator 510 operates to transmit light from fiber 540 to fiber 550, while inhibiting the transmission of light from fiber 550 to fiber 540.

In one embodiment, isolator core 520 includes a walk-off crystal 525, a spacer crystal 532, a Faraday rotator 530, and a half-wave plate 535. The internal operation of walk-off crystal 525, Faraday rotator 530, and half-wave plate 535 is similar to the internal operation of the walk-off crystal, Faraday rotator, and half-wave plate described above with respect to FIG. 1A.

Figure 5B:
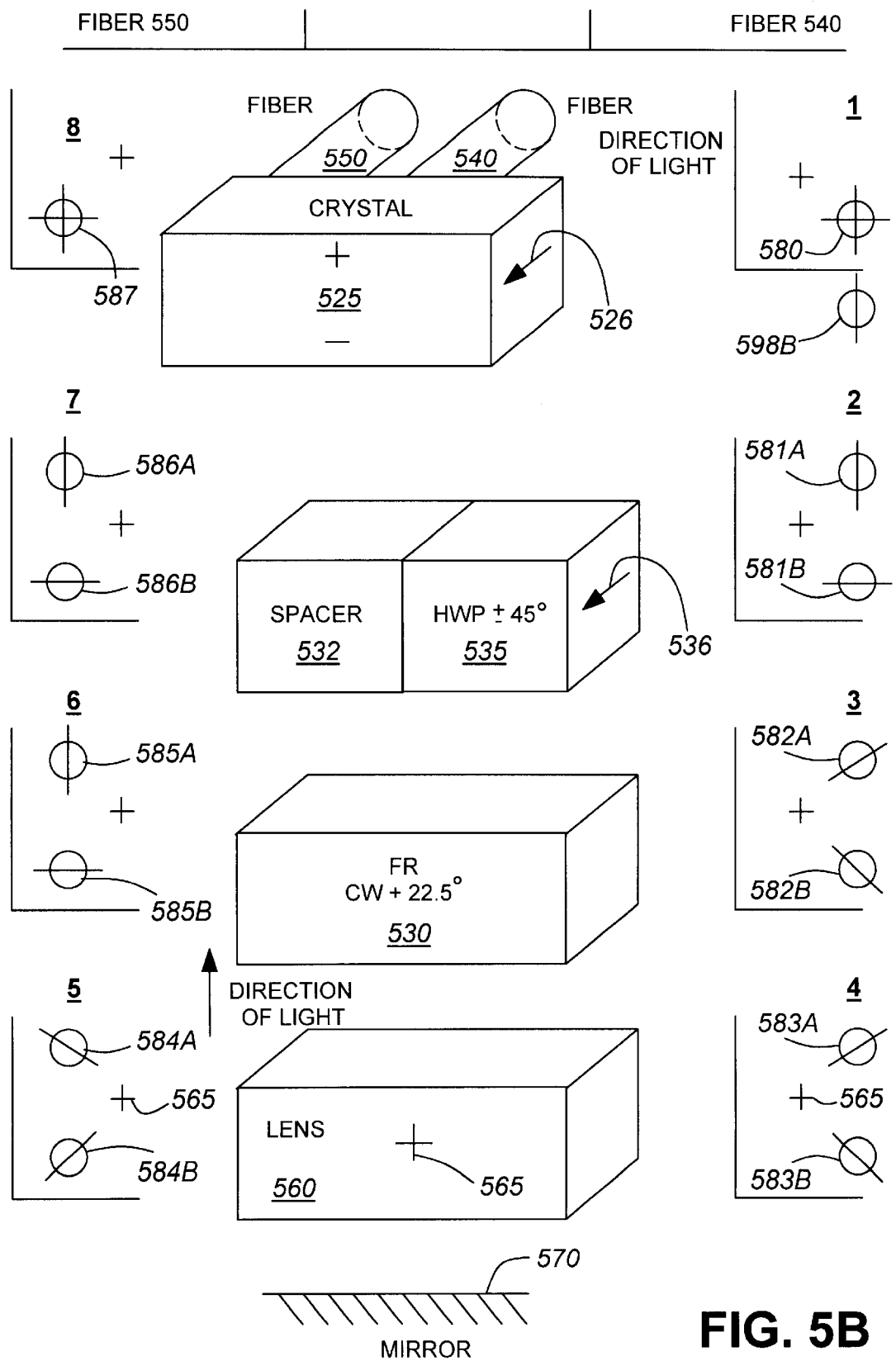
FIG. 5B illustrates the polarization of a light beam as it propagates in one direction through an alternative embodiment of an optical isolator.

FIG. 5B illustrates the polarization of a light beam as it propagates in one direction through one embodiment of an optical isolator. The isolator core 520 components are arranged in the same order as shown in FIG. 5A. It should be noted that the isolator components are shown as physically separated for ease of illustrating the polarization of the light beams in between the components. It should also be noted that the isolator components and the polarizations are not drawn to scale.

The walk-off direction for crystal 525 is shown by (+) and (−) symbols for which the walk-off direction for light traveling in the forward direction 526 is from (−) to (+). For light travel in the reverse direction, the walk-off direction is from (+) to (−). The forward direction 536 of the half-wave plate 535 is the direction for which the planes of polarization are rotated clockwise. For light propagating through half-wave plate 535 in a reverse direction, the planes of polarization are rotated counterclockwise.

The direction of light propagation in FIG. 5B is from fiber 540 to fiber 550. The positions 1 through 8 show the polarization effects of the isolator components on light beam 580 as it passes, in sequence, through walk-off crystal 525, half-wave plate 535, Faraday rotator 530, lens 560, mirror 570, spacer crystal 532, and walk-off crystal 425.

Light beam 580 transmitted from fiber 540 is split into two orthogonally polarized light beams 581A and 581B by walk-off crystal 525. Light beam 581A is polarized in a plane that is parallel to the walk-off direction of crystal 525 and is offset from light beam 581B by a distance proportional to its thickness as described above. At position 2, light beam 581A is polarized parallel to the walk-off direction of walk-off crystal 525 and light beam 581B is polarized perpendicular to the walk-off direction of walk-off crystal 525.

Half-wave plate 535 rotates the planes of polarization of light beams 581A and 581B clockwise by approximately 45 degrees resulting in light beams 582A and 582B having polarization planes as shown in position 3. The Faraday rotator 530 rotates the planes of polarization of light beams 582A and 582B by approximately 22.5 degrees in a clockwise direction with their resulting planes of polarization shown at position 4 as 583A and 583B, respectively.

The light beams 583A and 583B propagate to lens 560 where they are focused on to mirror 570 to be reflected back to lens 560. The light reflections are the mirror image of the incident light beams. As such, the light beams 584A and 584B are displaced away from the optical axes 565 of lens 560 a distance that is equal to the distance of light beams 583A and 583B, respectively, from the optical axes 565 of lens 560 as shown in position 5.

The polarization planes of light beams 584A and 584B are rotated approximately an additional 22.5 degrees clockwise by Faraday rotator 530 resulting in light beams 585A and 585B. In one embodiment, spacer crystal 532 is an isotropic crystal having an refractive index similar to half-wave plate 535. The spacer crystal is used to fill the space between Faraday rotator 530 and crystal 525 without rotating the polarization components of the light beams transmitted between them. In one embodiment, the spacer crystal is a half-wave plate with zero degrees of polarization rotation. In another embodiment, spacer 532 is a half-wave plate having a 22.5 degree polarization rotation and half-wave plate 535 has an opposite 22.5 degree polarization rotation.

At position 7, light beam 586A has its polarization plane parallel to the walk-off direction of crystal 525. As a result, light beam 586A will be diverted from (+) to (−) by the same divergence distance as light beam 581A at position 2. The light beams 586A and 586B are, thus, recombined when passed through walk-off crystal 525 resulting in light beam 587 at position 8. In this manner, in the forward direction, light beam 580 from fiber 540 will be passed through optical isolator core 520 to fiber 550.

Figure 5C:
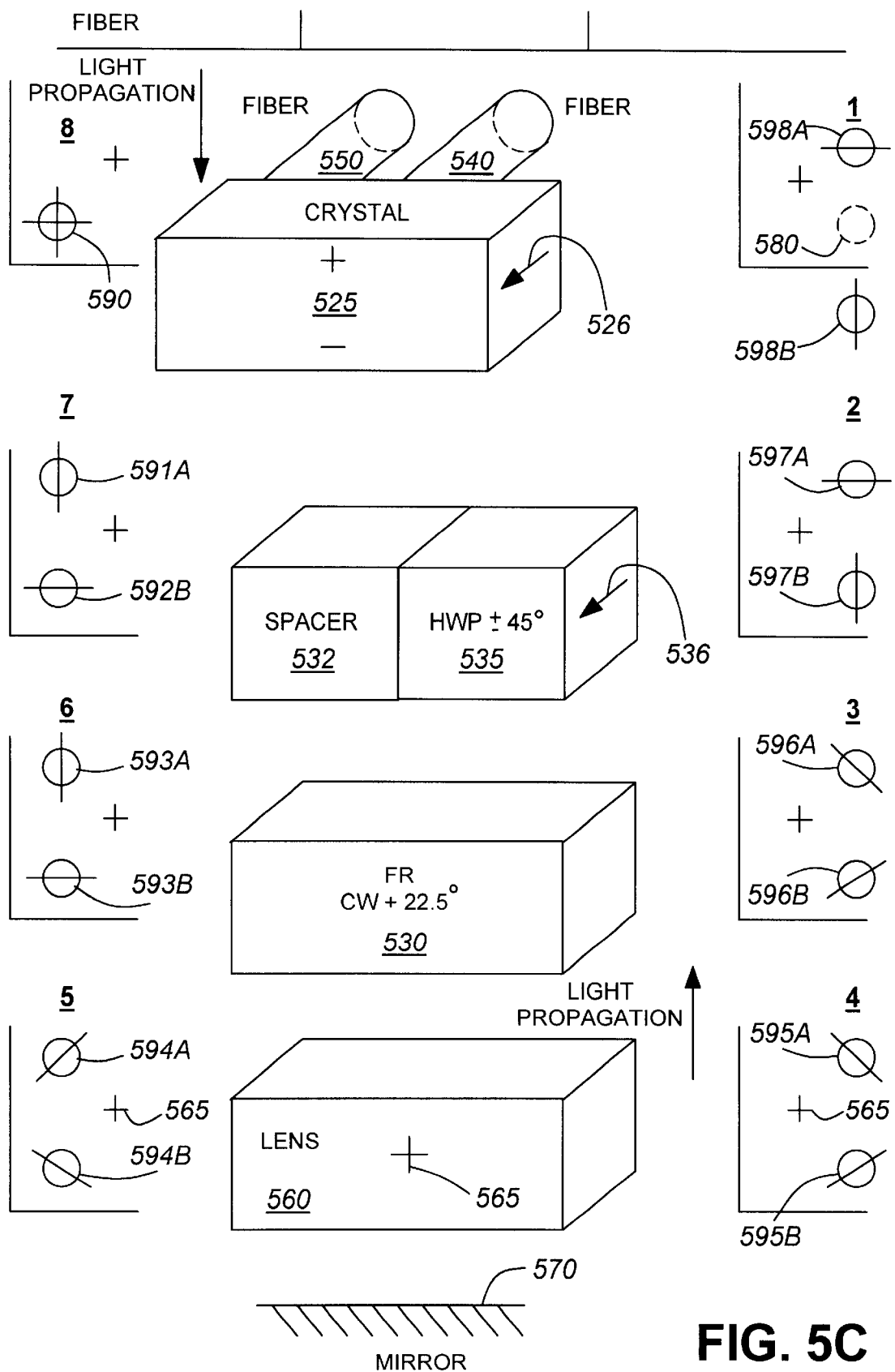
FIG. 5C illustrates the polarization of a light beam as it propagates in another direction through an alternative embodiment of an optical isolator.

FIG. 5C illustrates the polarization of a light beam as it propagates in another direction through one embodiment of an optical isolator. The direction of light propagation is from fiber 550 to fiber 540. The positions 8 through 1 show the polarization effects of the isolator components on light beam 590 as it passes, in sequence, through walk-off crystal 525, spacer crystal 532, Faraday rotator 530, lens 560, mirror 570, lens 560, half-wave plate 535, Faraday rotator 530, and walk-off crystal 525.

Light beam 590 transmitted from fiber 550 is split into two orthogonally polarized light beams 591A and 591B by walk-off crystal 525. Light beam 591A is polarized in a plane that is parallel to the walk-off direction of crystal 525 and is offset from light beam 591B by a distance proportional to the thickness of the walk-off crystal, as discussed above. At position 7, light beam 591A is polarized parallel to the walk-off direction of walk-off crystal 525 and light beam 591B is polarized perpendicular to the walk-off direction of walk-off crystal 525. Spacer crystal 532 has no polarization effect on light beams 591A and 591B.

The Faraday rotator 530 rotates the planes of polarization of light beams 592A and 492B by approximately 22.5 degrees in a clockwise direction with their resulting planes of polarization shown at position 5 as 594A and 594B, respectively. The non-reciprocal operation of the Faraday rotator 530 rotates the polarization planes of light beams to an orientation such that light beams are not ultimately recombined when passed back through walk-off crystal 525 as discussed below.

The light beams 594A and 594B propagate to lens 560 where they are focused on to mirror 570 to be reflected back to lens 560. The light reflections are the mirror image of the incident light beams. As such, light beams 595A and 595B are displaced away from the optical axes 565 of lens 560 a distance that is equal to the distance of light beams 594A and 594B, respectively, from the optical axes 565 of lens 560 as shown in position 4.

Lens 560 focuses the light beams onto Faraday rotator 530. The polarization planes of light beams 595A and 595B are rotated approximately an additional 22.5 degrees, clockwise, by Faraday rotator 530 resulting in light beams 596A and 596B at position 3.

The light beams propagate through half-wave plate 535. Half-wave plate 535 rotates the planes of polarization of light beams 596A and 596B counterclockwise by approximately 45 degrees resulting in light beams 597A and 597B having polarization planes as shown in position 2. At position 2, light beam 597B is polarized in a plane parallel to the walk-off direction of crystal 525 and is diverted from (+) to (−) as it passes through walk-off crystal 525. As a result, light beams 598A and 598B are offset relative to the position (dashed circle) of the original light beam 580 of FIG. 5B and, thus, are not transmitted to fiber 540. In this manner, light from fiber 550 is isolated from fiber 540. It should be noted that the positions of the spacer crystal and the half-wave plate in the isolator may be switched with the isolation of light between the fibers, correspondingly, reversed.

Figure 6:
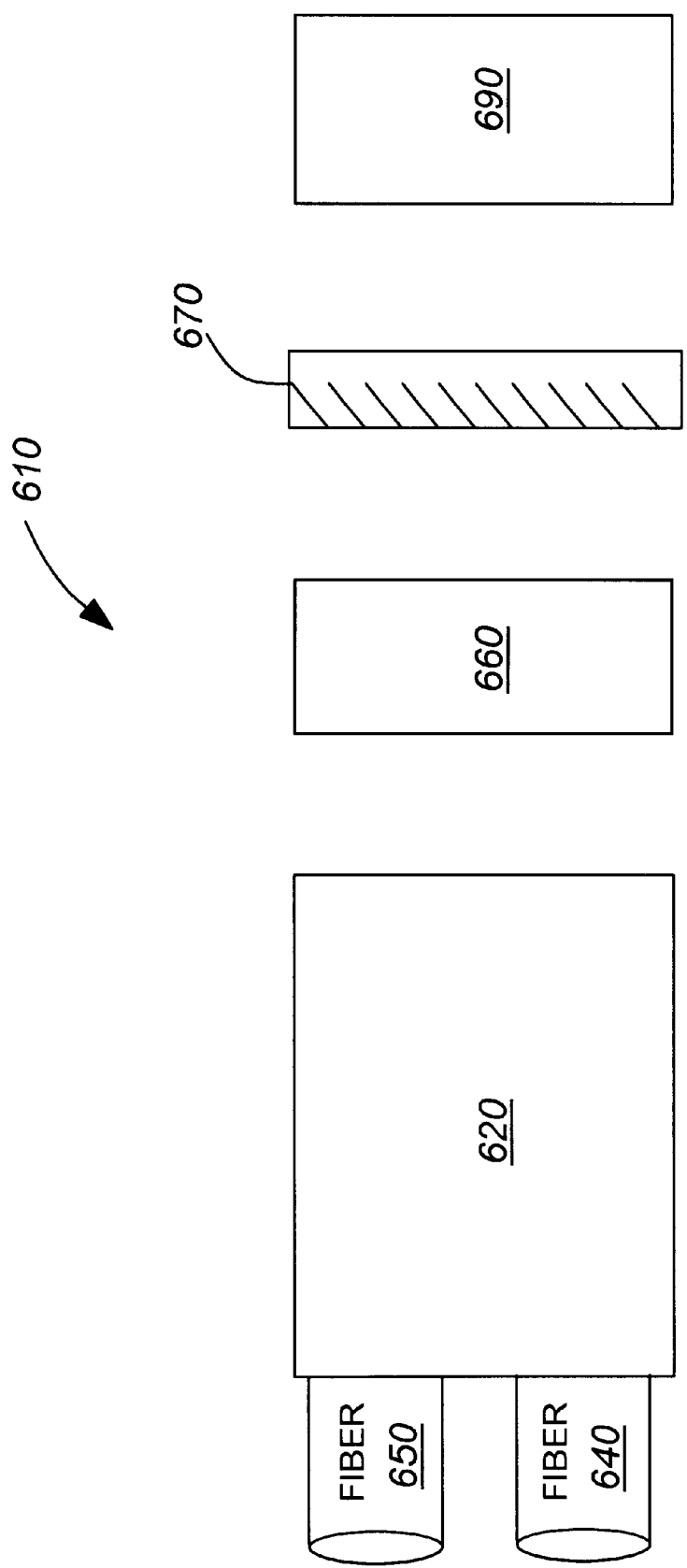
FIG. 6 illustrates one embodiment of a partial reflection optical isolator.

FIG. 6 illustrates one embodiment of a partial reflection optical isolator. In one embodiment, partial reflection optical isolator 610 includes a single isolator core 620 placed in front of fibers 640 and 650. A lens 660 and a mirror 670 are positioned between the isolator core 620 and a photodetector 690. Optical isolator 610 operates to transmit light from fiber 640 to fiber 650 and a portion of light from fiber 640 to photodetector 690, while inhibiting the transmission of light from fiber 650 to fiber 640.

In one embodiment, isolator core 620 is the same as isolator core 520 of FIG. 5A. In an alternative embodiment, isolator core 620 may have other configurations to propagate light from fiber 640 to fiber 650 while inhibiting the transmission of light from fiber 650 to fiber 640.

In one embodiment, two light beams (not shown) having orthogonal polarizations are propagated to lens 660 where they are focused to mirror 670. In another embodiment, an isolator core outputting a single light beam may be used. Mirror 670 is a partial reflecting mirror. A partial reflecting mirror transmits a portion of the power of an incident light beam through the mirror while reflecting the remaining power of the incident light beam. As such, a portion of the power of light is transmitted through mirror 670 to photodetector 690. In one embodiment, approximately 5% of light is transmitted to the photodetector 690. In another embodiment, a different percentage of light incident on mirror 670 is transmitted to photodetector 690. The remaining portion of light power not transmitted through mirror 670 is reflected back to lens 665 to be focused onto isolator core 620. It should be noted that a photodetector is well known in the art; accordingly, a more detailed description of its internal composition and operation is not provided herein.

In another embodiment, mirror 670 is another type of partial reflector, for example, an optical tap. In one embodiment, mirror 670 is a wavelength division multiplexer (WDM) filter. A WDM filter operates to reflect a light beam having a first predetermined wavelength and to transmit a light beam a second predetermined wavelength. As such, when two light beam signals of two different wavelengths are transmitted from fiber 640, the two light beam signals will be separated according to their wavelength. A light beam having one wavelength will be transmitted to photodetector 690 and the light beam having another wavelength will be reflected by the WDM filter to be propagated to fiber 650. It should be noted that a WDM filter is well known in the art; accordingly, a more detailed description of its internal composition and operation is not provided herein.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An isolator core, comprising:
   a walk-off crystal;
   a non-reciprocal rotator directly coupled to the walk-off crystal; and
   a reciprocal rotator directly coupled to the walk-off crystal.

2. The isolator core of claim 1, wherein light is propagated through a first portion of the walk-off crystal in a forward propagating direction to a second portion of the walk-off crystal and through a second portion of the walk-off crystal in a backward propagating direction to the first portion of the walk-off crystal.

3. The isolator core of claim 2, wherein the light propagated through the first portion of the walk-off crystal in the forward propagating direction is propagated through each of the reciprocal rotator and the non-reciprocal rotator before propagating through the second portion of the walk-off crystal.

4. The isolator core of claim 3, wherein the light propagated through the second portion of the walk-off crystal in the backward propagating direction is propagated through each of the non-reciprocal rotator and the reciprocal rotator before propagating through the first portion of the walk-off crystal.

5. The isolator core of claim 4, wherein the reciprocal rotator rotates a plane of polarization of light by a predetermined angle in a direction and wherein the non-reciprocal rotator rotates the plane of polarization of the light by the predetermined angle in the direction.

6. The isolator core of claim 5, wherein the predetermined angle is approximately 45 degrees.

7. The isolator core of claim 4, wherein the reciprocal rotator rotates a plane of polarization of light approximately 45 degrees when the light is passed through the reciprocal rotator in the forward propagating direction and wherein the non-reciprocal rotator rotates the plane of polarization of the light approximately 45 degrees when the light is passed through the non-reciprocal rotator in the forward propagating direction.

8. The isolator core of claim 7, wherein the reciprocal rotator rotates a plane of polarization of light approximately negative 45 degrees when the light is passed through the reciprocal rotator in the backward propagating direction and wherein the non-reciprocal rotator rotates the plane of polarization of the light approximately 45 degrees when the light is passed through the non-reciprocal rotator in the backward propagating direction.

9. The isolator core of claim 8, wherein the non-reciprocal rotator is a Faraday rotator.

10. The isolator core of claim 8, wherein the reciprocal rotator is a half-wave plate.

11. An optical isolator, comprising:
a lens;
a mirror coupled to the lens; and
an isolator core coupled to the lens, the isolator core consisting of:
a walk-off crystal;
a non-reciprocal rotator led to the walk-off crystal; and
a reciprocal rotator coupled to the walk-off crystal.

12. The optical isolator of claim 11, wherein light propagated through the reciprocal rotator is focused by the lens to the mirror, the mirror to reflect the light back to the lens, the lens to focus the light to the non-reciprocal rotator.

13. The isolator core of claim 12, wherein the reciprocal rotator rotates a plane of polarization of light by a predetermined angle in a direction and wherein the non-reciprocal rotator rotates the plane of polarization of the light by the predetermined angle in the direction.

14. The optical isolator of claim 12, wherein the reciprocal rotator rotates a plane of polarization of light approximately 45 degrees when the light is passed through the reciprocal rotator in a forward propagating direction and wherein the non-reciprocal rotator rotates the plane of polarization of the light approximately 45 degrees when the light is passed through the non-reciprocal rotator in the forward propagating direction.

15. The optical isolator of claim 14, wherein the reciprocal rotator rotates a plane of polarization of light approximately negative 45 degrees when the light is passed through the reciprocal rotator in a backward propagating direction and wherein the non-reciprocal rotator rotates the plane of polarization of the light approximately 45 degrees when the light is passed through the non-reciprocal rotator in the backward propagating direction.

16. An optical isolator comprising:
a mirror;
a lens optically coupled to the mirror; and
an isolator core optically coupled to the lens, the isolator core consisting of:
a walk-off crystal having a first end optically coupled to the lens and a second end including a first port and a second port, at least one of the first and second ports for launching an optical signal into the walk-off crystal;
a single reciprocal rotator optically coupled to the first end of the walk-off crystal; and
a single non-reciprocal rotator optically coupled to the first end of the walk-off crystal,
wherein the optical isolator core is designed such that an optical signal launched through the walk-off crystal from either of the first and second ports passes through only one of the reciprocal rotator and the non-reciprocal rotator before reaching the mirror.

17. An optical isolator as defined in claim 16, wherein the reciprocal rotator is a half-wave plate for rotating the polarization of each of the first and second rays through an angle α in a forward propagating direction and through an angle-α in a backwards propagating direction.

18. An optical isolator as defined in claim 17, wherein the non-reciprocal rotator is a Faraday rotator for rotating the polarization of each of the first and second rays by an angle α in both the forward and backward propagating directions.

19. An optical isolator as defined in claim 18, wherein the angle α is about 45°.

20. An optical isolator as defined in claim 19, wherein the mirror is at least partially reflective.

21. An optical isolator as defined in claim 20, further comprising a photodetector to receive a portion of a beam of light launched to the at least partially reflective mirror.

22. An optical isolator as defined in claim 21, wherein the mirror is a wavelength division multiplexer filter and wherein the mirror reflects light having a first wavelength and transmits light having a second wavelength.

23. An optical isolator comprising:
a mirror;
a lens optically coupled to the mirror;
a walk-off crystal having a first end optically coupled the lens and a second end including a first port and a second port, at least one of the first and second ports for launching an optical signal into the walk-off crystal;
a reciprocal rotator optically coupled to the first end opposite the first port; and
a non-reciprocal rotator optically coupled to the first end opposite the second port,
wherein the optical isolator is designed such that an optical signal launched through the walk-off crystal from either of the first and second ports only passes through the lens and one of the reciprocal rotator and the non-reciprocal rotator before reaching the mirror.

* * * * *